(12) United States Patent
Harada et al.

(10) Patent No.: US 12,194,861 B2
(45) Date of Patent: Jan. 14, 2025

(54) VEHICLE CONTROL DEVICE

(71) Applicant: DENSO CORPORATION, Kariya (JP)

(72) Inventors: Akihiro Harada, Kariya (JP); Seiji Nakayama, Kariya (JP); Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/492,104

(22) Filed: Oct. 23, 2023

(65) Prior Publication Data

US 2024/0042869 A1 Feb. 8, 2024

Related U.S. Application Data

(63) Continuation of application No. PCT/JP2022/014032, filed on Mar. 24, 2022.

(30) Foreign Application Priority Data

Apr. 28, 2021 (JP) ................. 2021-076450

(51) Int. Cl.
  *B60W 10/08* (2006.01)
  *B60L 15/20* (2006.01)
  (Continued)

(52) U.S. Cl.
  CPC ............. *B60L 15/20* (2013.01); *B60W 10/08* (2013.01); *B60W 10/182* (2013.01);
  (Continued)

(58) Field of Classification Search
  CPC ............... B60W 10/182; B60W 10/08; B60W 30/18027; B60W 30/18109;
  (Continued)

(56) References Cited

U.S. PATENT DOCUMENTS 5,807,205 A * 9/1998 Odaka .................. F16H 63/483
   477/901
9,610,859 B1 * 4/2017 Cho ....................... B60W 10/06
(Continued)

FOREIGN PATENT DOCUMENTS

JP   2005168076 A   6/2005
JP   2019122168 A   7/2019
(Continued)

*Primary Examiner* — Roger L Pang
(74) *Attorney, Agent, or Firm* — Nixon & Vanderhye P.C.

(57) ABSTRACT

A vehicle control device includes an actuator drive control section that controls drive of an actuator, a main motor drive control section that controls drive of a main motor, and a stagnation determination section. The stagnation determination section determines a stagnation of the actuator based on a detected value of a sensor unit that detects a physical quantity that changes according to a drive state of the actuator. When performing a meshing surface pressure reduction control for reducing a meshing surface pressure generated at the meshing point between a parking gear and a parking lever by driving the main motor, the main motor drive control section decreases a main motor torque which is a torque of the main motor based on the detected value of the sensor unit.

15 Claims, 21 Drawing Sheets

(51) Int. Cl.
   *B60W 10/18* (2012.01)
   *F16H 59/50* (2006.01)
   *F16H 59/66* (2006.01)
   *F16H 63/34* (2006.01)
   *F16H 63/38* (2006.01)

(52) U.S. Cl.
   CPC ............ *F16H 59/50* (2013.01); *F16H 59/66* (2013.01); *F16H 63/3466* (2013.01); *F16H 63/38* (2013.01); *B60W 2510/08* (2013.01); *B60W 2510/087* (2013.01); *B60W 2552/15* (2020.02); *B60W 2710/083* (2013.01); *F16H 2059/663* (2013.01)

(58) Field of Classification Search
   CPC ......... B60W 30/18118; B60W 30/184; B60W 2710/083; B60W 2552/15; B60W 2510/087; B60W 2510/08; F16H 59/50; F16H 59/66; F16H 63/3466; F16H 63/38; F16H 2059/663; F16H 63/48; F16H 63/50; B60L 15/20; B60L 2240/30; B60L 2240/423

USPC ......................................... 477/183, 194, 197
   See application file for complete search history.

(56) References Cited

U.S. PATENT DOCUMENTS

| | | | | |
   |---|---|---|---|---|
   | 9,981,666 | B2* | 5/2018 | Ono | B60W 30/18027 |
   | 10,571,023 | B2* | 2/2020 | Neelakantan | F16H 63/50 |
   | 2013/0305863 | A1* | 11/2013 | Weslati | F16H 63/48 74/411.5 |
   | 2024/0042849 | A1* | 2/2024 | Harada | B60K 26/02 |
   | 2024/0059155 | A1* | 2/2024 | Harada | F16H 63/3466 |
   | 2024/0067142 | A1* | 2/2024 | Harada | B60T 17/221 |

FOREIGN PATENT DOCUMENTS

| | | |
   |---|---|---|
   | WO | 2022230477 A1 | 11/2022 |
   | WO | 2022230478 A1 | 11/2022 |
   | WO | 2022230480 A1 | 11/2022 |
   | WO | 2023276682 A1 | 1/2023 |
   | WO | 2023276683 A1 | 1/2023 |

* cited by examiner

VEHICLE CONTROL DEVICE

CROSS REFERENCE TO RELATED APPLICATIONS

This application is a continuation application of International Patent Application No. PCT/JP2022/014032 filed on Mar. 24, 2022, which designated the U.S. and based on and claims the benefits of priority of Japanese Patent Application No. 2021-076450 filed on Apr. 28, 2021. The entire disclosure of all of the above applications is incorporated herein by reference.

TECHNICAL FIELD

The present disclosure relates to a vehicle control device.

BACKGROUND

Conventionally, an electronic control device is known that controls an operation of a parking lock mechanism via an actuator to switch a shift range of an automatic transmission.

SUMMARY

An object of the present disclosure is to provide a vehicle control device capable of appropriately releasing a parking lock.

A vehicle control device of the present disclosure controls a vehicle drive system. The vehicle drive system includes a main motor, a parking lock mechanism, and an actuator. The main motor is a drive source of a vehicle. The parking lock mechanism has a parking lever that can lock an axle by engaging a parking gear connected to the axle, and can lock a rotation of the axle by engaging a parking gear and the parking lever. The actuator can drive the parking lever.

The vehicle control device includes an actuator drive control section that controls drive of the actuator, a main motor drive control section that controls drive of the main motor, and a stagnation determination section. When performing a meshing surface pressure reduction control for reducing a meshing surface pressure generated at a meshing point between the parking gear and the parking lever by driving the main motor, the main motor drive control section decreases the main motor torque which is a torque of the main motor based on a detected value of the sensor unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In an assumable example, an electronic control device controls an operation of a parking lock mechanism via an actuator to switch a shift range of an automatic transmission. For example, when the parking lock mechanism cannot be released by an output torque of the actuator, the motor generator, which is a drive source, outputs drive torque capable of releasing the parking lock mechanism.

However, the assumable example does not mention how to return the torque applied by the motor generator. An object of the present disclosure is to provide a vehicle control device capable of appropriately releasing a parking lock.

A vehicle control device of the present disclosure controls a vehicle drive system. The vehicle drive system includes a main motor, a parking lock mechanism, and an actuator. The main motor is a drive source of a vehicle. The parking lock mechanism has a parking lever that can lock an axle by engaging a parking gear connected to the axle, and can lock a rotation of the axle by engaging a parking gear and the parking lever. The actuator can drive the parking lever.

The vehicle control device includes an actuator drive control section that controls drive of the actuator, a main motor drive control section that controls drive of the main motor, and a stagnation determination section. When performing a meshing surface pressure reduction control for reducing a meshing surface pressure generated at a meshing point between the parking gear and the parking lever by driving the main motor, the main motor drive control section decreases the main motor torque which is a torque of the main motor based on a detected value of the sensor unit. Thereby, the parking lock can be properly released.

Hereinafter, a vehicle control device will be described with reference to the drawings. Hereinafter, in a plurality of embodiments, a substantially equivalent configuration will be denoted by an identical reference, and explanation thereof will be omitted.

First Embodiment

Figure 1:
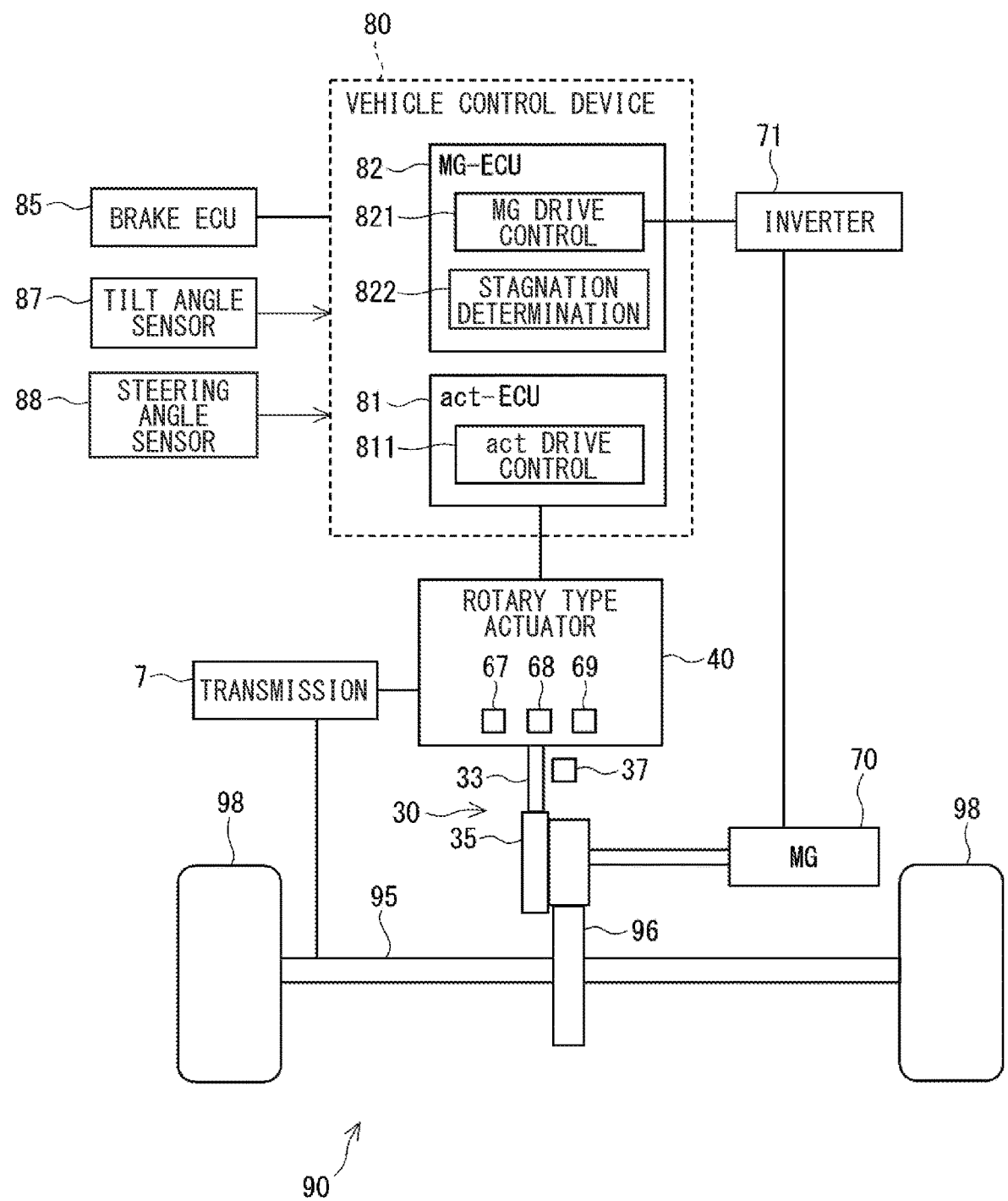
FIG. 1 is a schematic configuration diagram showing a vehicle drive system according to a first embodiment.

A first embodiment will be described based on FIGS. 1 to 12. As shown in FIG. 1, a vehicle drive system 90 includes a main motor 70, an inverter 71, a parking lock mechanism 30, an actuator 40, a vehicle control device 80, and the like, and is mounted on a vehicle 100 (see FIG. 6). Hereinafter, the main motor 70 will be referred to as "MG" as appropriate.

The main motor 70 is a so-called "motor generator." The main motor 70 has a function of an electric motor that generates torque by being driven by electric power from a battery (not shown) via the inverter 71 and a function of a generator that is driven when the vehicle 100 is decelerated to generate electricity. The driving force generated by the main motor 70 rotates the wheels 98 via a reduction gear 72 and an axle 95. FIG. 1 shows an example of an electric vehicle in which the drive source of the vehicle 100 is the main motor 70, but the vehicle 100 may be a hybrid vehicle that also has an engine (not shown) as the drive source. A detent mechanism 20 is omitted in FIG. 1.

Figure 2:
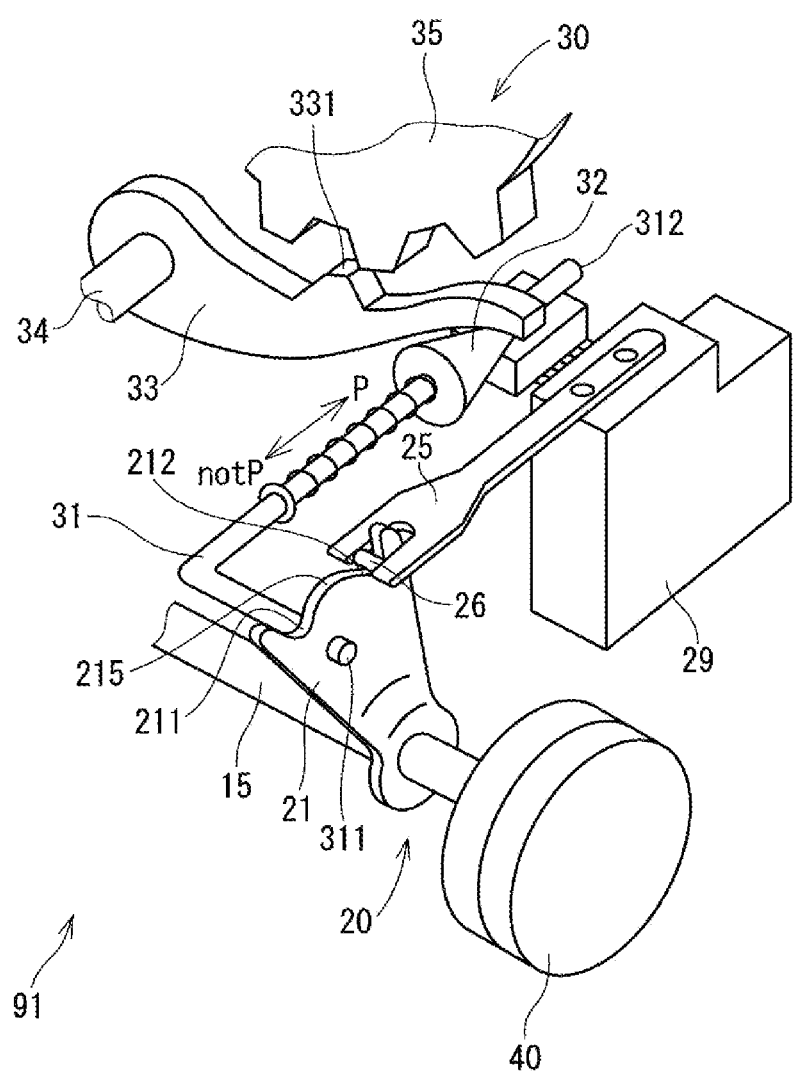
FIG. 2 is a perspective view explaining a detent switching mechanism and a parking lock mechanism according to the first embodiment.

As shown in FIG. 2, a shift-by-wire system 91 includes the actuator 40, the detent mechanism 20, a parking lock mechanism 30, and the like. The actuator 40 is of a rotary type and includes a motor 50 and a power transmission section 510 (see FIG. 3, etc.).

The motor 50 is a DC motor with brushes, and rotates when power is supplied from a battery (not shown) through a drive circuit such as an H bridge circuit, and functions as a drive source for the detent mechanism 20. The detent mechanism 20 has a detent plate 21, a detent spring 25 and the like, and transmits rotational driving force output from the motor 50 to the parking lock mechanism 30.

The detent plate 21 is fixed to an output shaft 15 and driven by the motor 50. On the detent spring 25 side of the detent plate 21, two valley portions 211 and 212 and a peak portion 215 separating the two valley portions 211 and 212 are provided.

The detent spring 25 is an elastically deformable plate-like member, and is provided with a detent roller 26 at a tip of the detent spring 25. The detent spring 25 urges the detent roller 26 toward a rotation center of the detent plate 21. In an no-load state, a position where the detent rollers 26 are dropped by the spring force of the detent spring 25 is referred to as a bottommost portion of the valley portions 211 and 212.

When a rotational force equal to or greater than a predetermined force is applied to the detent plate 21, the detent spring 25 is elastically deformed, and the detent roller 26 moves between the valley portions 211 and 212. By fitting the detent roller 26 into one of the two valley portions 211 and 212, the swinging of the detent plate 21 is restricted, and a state of the parking lock mechanism 30 is fixed, and the shift range is fixed.

The parking lock mechanism 30 includes a parking rod 31, a conical member 32, a parking lever 33, a shaft part 34 and a parking gear 35. The parking rod 31 is formed in a substantially L-shape. The parking rod 31 is fixed to the detent plate 21 on a side of one end 311. The conical member 32 is provided to the other end 312 of the parking rod 31. The conical member 32 is formed to reduce in diameter toward the other end 312. When the detent plate 21 rotates in the direction in which the detent roller 26 fits into the valley portion 211 corresponding to the P range, the conical member 32 moves in the direction of the arrow P.

The parking lever 33 comes into contact with a conical surface of the conical member 32 and is provided so as to be swingable around the shaft part 34. On the parking gear 35 side of the parking lever 33, a protrusion 331 that can mesh with the parking gear 35 is provided. When the conical member 32 moves in the direction of the arrow P due to the rotation of the detent plate 21, the parking lever 33 is pushed up and the protrusion 331 and the parking gear 35 mesh with each other. On the other hand, when the conical member 32 moves in the direction of the arrow notP, the meshing between the protrusion 331 and the parking gear 35 is released.

The parking gear 35 is connected to an axle 95 via a reduction gear set 96 (see FIG. 1), and is provided so as to be able to mesh with the protrusion 331 of the parking lever 33. When the parking gear 35 meshes with the protrusion 331, a rotation of the axle 95 is restricted. When the shift range is one of the ranges (not P range) other than the P range, the parking gear 35 is not locked by the parking lever 33. Therefore, the rotation of the axle 95 is not restricted by the parking lock mechanism 30. When the shift range is the P range, the parking gear 35 is locked by the parking lever 33 and the rotation of the axle 95 is restricted.

Figure 3:
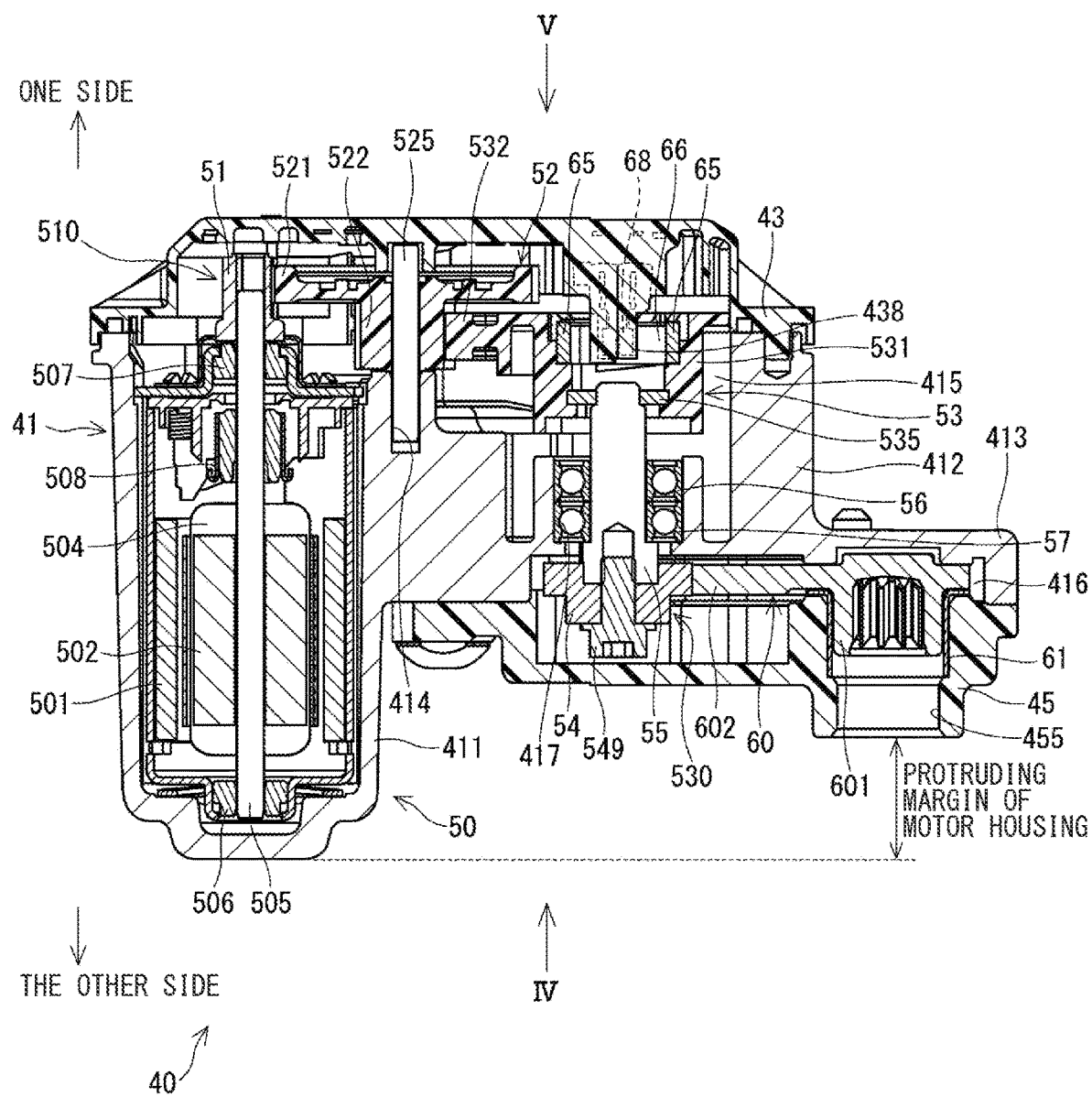
FIG. 3 is a cross-sectional view showing an actuator according to the first embodiment.
Figure 4:
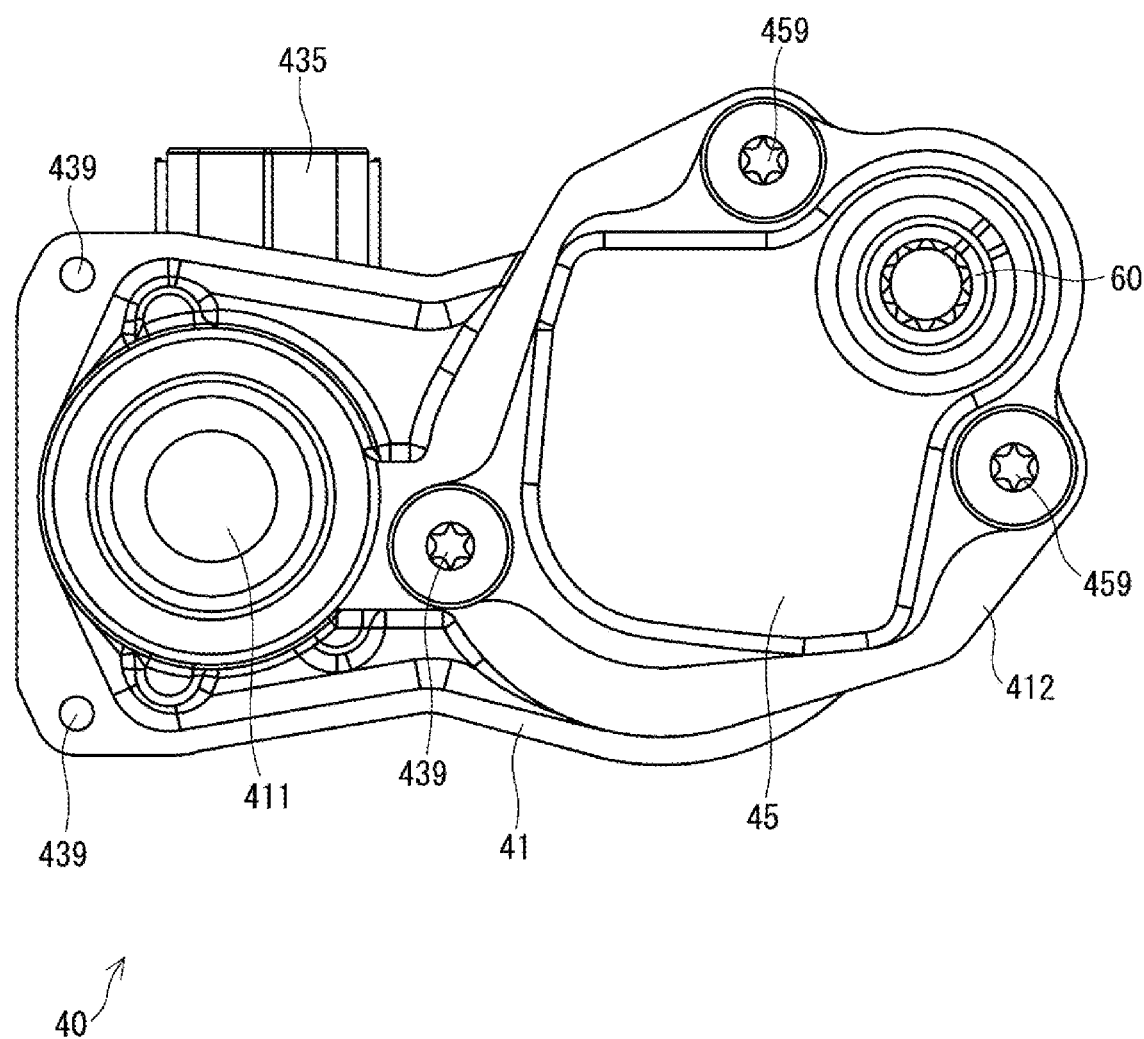
FIG. 4 is a diagram seen from a direction of an arrow VI in FIG. 3.
Figure 5:
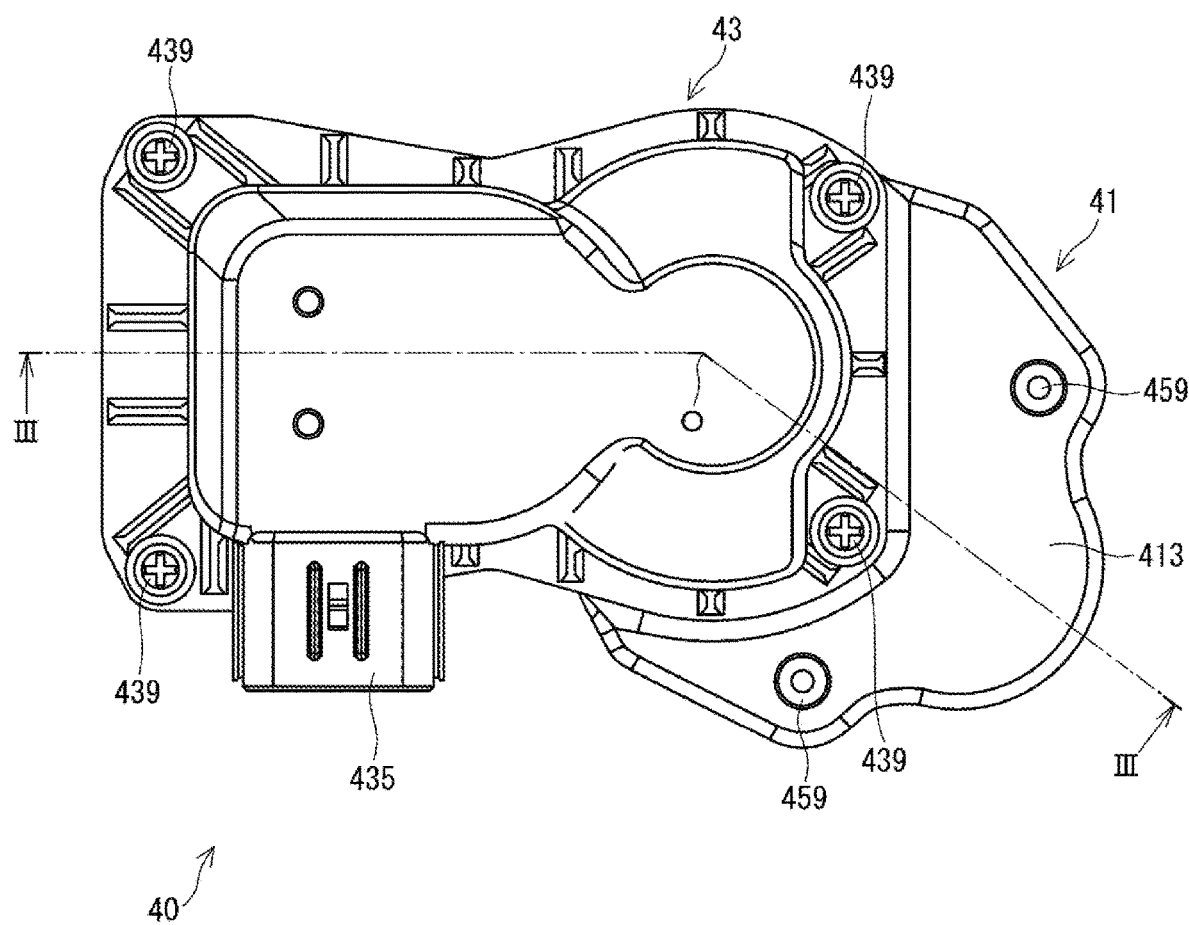
FIG. 5 is a diagram seen from a direction of an arrow V in FIG. 3.

The actuator 40 is shown in FIGS. 3 to 5. FIG. 3 is a cross-sectional view taken along a line III-III in FIG. 5. In FIG. 3, an axial direction of the motor 50 is defined as a vertical direction of the paper, an upper side of the paper is defined as "one side", and a lower side of the paper is defined as "the other side".

A housing 41 is made of metal such as aluminum, and is composed of a motor housing portion 411 and a gear housing portion 412. The motor housing portion 411 is formed in a substantially bottomed cylindrical shape that is open on one side in the axial direction. The gear housing portion 412 is formed to protrude radially outward from the motor housing portion 411. One end face of the gear housing portion 412 is formed substantially flush with one end face of the motor housing portion 411. The other side end surface of the gear housing portion 412 is positioned in a middle of the motor housing portion 411 in the axial direction. In other words, the motor housing portion 411 protrudes to the other side. An output shaft gear housing portion 413 for housing the output shaft gear 60 is formed in the gear housing portion 412 so as to protrude in the opposite direction to the motor housing portion 411.

A sensor cover 43 and a gear cover 45 are provided on both sides of the housing 41. The sensor cover 43 is provided on one side of motor housing portion 411 and gear housing portion 412 and fixed to the housing 41 with a plurality of screws 439. A connector 435 is provided on the sensor cover 43, and power is supplied to the actuator 40 via the connector 435. It also transmits and receives signals to and from the outside via the connector 435. The gear cover 45 is provided on the other side of the gear housing portion 412 and fixed to the housing 41 with the screws 459.

The motor 50 has a magnet 501, a core 502, a coil 504, a motor shaft 505, a commutator 508, and brushes (not shown). The magnet 501 is fixed to the inner peripheral side of motor housing portion 411. The core 502 is provided inside the magnet 501 in the radial direction, and generates a rotational force when current flows through the coil 504 wound around the core 502. The motor shaft 505 is rotatably supported by a pair of bearings 506 and 507 and rotates together with the core 502. The commutator 508 causes the current supplied from the brush to flow through the coil 504.

The power transmission portion 510 is provided between the motor shaft 505 and the output shaft 15 and transmits the driving force of the motor 50 to the output shaft 15. The power transmission portion 510 has gears 51 to 54 and 60. The gears 51 to 54 and 60 are all spur gears.

The motor gear 51 and the gears 52 and 53 are arranged in a first gear chamber 415 that opens to one side of the housing 41. The gear 54 and the output shaft gear 60 are arranged in a second gear chamber 416 that opens on the other side of the housing 41. The first gear chamber 415 and the second gear chamber 416 communicate with each other through a shaft hole 417 through which a gear connection shaft 55 is inserted. In the present embodiment, the motor gear 51, the gear 54, and the output shaft gear 60 are made of metal, and the gears 52 and 53 are made of resin.

The motor gear 51 is fixed to one side of the motor shaft 505 and rotates together with the motor shaft 505. The gear 52 has a large diameter portion 521 and a small diameter portion 522 and rotates together with shaft 525. A spur tooth is formed on the radially outer side of the large diameter portion 521 and meshes with the motor gear 51. A spur tooth is formed on the radially outer side of the small diameter portion 522 and meshes with the gear 53. The shaft 525 is inserted into an axial hole 414 formed in the housing 41 and rotatably supported.

The gear 53 has a tubular portion 531 and a gear portion 532. The gear portion 532 is formed to protrude radially outward from the tubular portion 531. The gear portion 532 is formed with spur teeth that mesh with the small diameter portion 522 of the gear 52. The gear portion 532 is formed within a range (for example, less than 180°) in which an absolute angle can be detected by a position sensor 68. A shaft fixing member 535 is provided radially inside the tubular portion 531. The shaft fixing member 535 is made of metal, for example.

The gear connection shaft 55 is rotatably supported in the housing 41 by the bearings 56 and 57. In the present embodiment, the bearings 56 and 57 are ball bearings and are press-fitted into the shaft hole 417. By providing a plurality of bearings, tilting of the gear connection shaft 55 can be suppressed. In addition, since rattling in the radial direction of the gear connection shaft 55 can be suppressed, it is possible to reduce the occurrence of wear due to hitting of the shaft.

One side of the gear connection shaft 55 is press-fitted into the shaft fixing member 535 provided radially inside the tubular portion 531 of the gear 53 and fixed by, for example, rolling caulking. Thereby, the gear 53 is fixed to one side of the gear connection shaft 55. The gear 54 is fixed to the other side of the gear connection shaft 55 with a bolt 549. As a result, the tubular portion 351 of the gear 53 and the gear 54 are coaxially connected by the gear connection shaft 55 and rotate together. In the present embodiment, the gear 53 and the gear 54 constitute a connection gear 530. The gear 54 is formed to have substantially the same diameter as the tubular portion 531, and has spur teeth that mesh with the output shaft gear 60 on the entire outer periphery in the radial direction.

The output shaft gear 60 has an output shaft connection portion 601 formed in a substantially cylindrical shape and a gear portion 602. The output shaft connection portion 601 is rotatably supported on the gear cover 45 by a bushing 61 provided radially outward of the output shaft connection portion 601. The output shaft 15 (see FIG. 1) is press-fitted inside the output shaft connection portion 601 in the radial direction, and rotates integrally. The bushing 61 is press-fitted into an output shaft holding portion 455 of the gear cover 45.

The gear portion 602 is formed to protrude radially outward of the output shaft connection portion 601 and meshes with the gear 54. In the present embodiment, a meshing point between the motor gear 51 and the large diameter portion 521 of the gear 52 constitutes a first speed reduction stage, a meshing point between the small diameter portion 522 of the gear 52 and the gear portion 532 of the gear 53 constitutes a second speed reduction stage, and a meshing point between the gear 54 and the gear portion 602 of the output shaft gear 60 constitutes a third speed reduction stage. That is, in the present embodiment, the number of reduction stages is three, and the third reduction stage is a final reduction stage.

The gears 52, 53 and the like are assembled from one side of housing 41, and gear 54 and output shaft gear 60 and the like are assembled from the other side of housing 41. By changing the length of the gear connection shaft 55 that connects the gear 53 and the gear 54, the protruding margin of the motor housing portion 411 can be adjusted according to the mating parts assembled via the actuator 40 and the output shaft 15. As a result, the degree of freedom in mounting can be improved.

A sensor magnet 65 is provided radially inside the tubular portion 531 of the gear 53 and closer to the sensor cover 43 than the shaft fixing member 535. The sensor magnet 65 is formed in a narrow plate shape, for example, and is provided on the opposite side of the gear 53 with the rotating shaft interposed therebetween. In other words, the sensor magnets 65 are provided 180 degrees apart. The sensor magnets 65 are held by a magnet holding member 66 formed in an annular shape. The magnet holding member 66 is fixed to the tubular portion 531 by press fitting or the like.

The position sensor 68 is held by a sensor holding portion 438 that protrudes from the sensor cover 43. The position sensor 68 has a Hall IC that detects changes in the magnetic field due to the rotation of the sensor magnets 65, and is provided so that the sensor element is positioned at the center of the two sensor magnets 65. In the present embodiment, since the reduction ratio of the final reduction stage is 6 or less and the rotation range of the gear 53 is less than 180°, the position sensor 68 can detect the rotation position of the gear 53 as an absolute angle. Further, the absolute angle of the output shaft 15 can be calculated by gear ratio conversion. The position sensor 68 may be a linear sensor, an encoder, a resolver, or the like, and may detect a rotational position other than the gear 53.

The gear 53 provided with the sensor magnet 65 constitutes a speed reduction stage one stage before the final speed reduction stage. Therefore, compared with the output shaft gear 60, the transmission torque is small, and the eccentric force generated by variations in gear tooth surface shape, vibration, and the like is small. Then, compared with the case of detecting the angle of the output shaft gear 60, it is possible to suppress the deterioration of the sensor accuracy.

Further, as shown in FIG. 1, the actuator 40 is provided with a current sensor 67 that detects the current of the motor 50 and a temperature sensor 69 that detects the temperature.

The vehicle control device 80 has an actuator control unit (hereinafter "act-ECU") 81 and an MG control unit (hereinafter "MG-ECU") 82. The act-ECU 81 and the MG-ECU 82 are mainly composed of a microcomputer and the like, and internally includes, although not shown in the figure, a CPU, a ROM, a RAM, an I/O, a bus line for connecting these components, and the like. Each process executed by the ECUs may be software processing or may be hardware processing. The software processing may be implemented by causing a CPU to execute a program. The program may be stored beforehand in a material memory device such as a ROM, that is, in a readable non-transitory tangible storage medium. The hardware processing may be implemented by a special purpose electronic circuit.

The vehicle control device 80 acquires detected values of the range sensor 37, the position sensor 68, the temperature sensor 69, a tilt angle sensor 87, and a steering angle sensor 88, and can use these detected values for various controls. Further, an oil temperature of a transmission 7 connected to the detent mechanism 20 (hereinafter referred to as "TM oil temperature") or the like may be used for the energization control of the coil 504. The transmission 7 may be a transaxle or the like. Further, the vehicle control device 80 is provided so as to be able to transmit and receive various information to and from a brake ECU 85.

The range sensor 37 is provided outside the actuator 40 and near the parking lever 33, and is a sensor that determines that the shift range has switched from one of the P range and the notP range to the other thereof. The position sensor 68 is provided inside the actuator 40 and can continuously detect the rotation of the rotating body.

The act-ECU 81 has an actuator drive control section 811 and the like as functional blocks, and controls the energization of the motor 50 based on the shift range requested by the driver, the signal from the brake switch, the vehicle speed, and the like so as to control an operation of the parking lever 33.

The MG-ECU 82 has, as functional blocks, an MG drive control section 821, a stagnation determination section 822, and the like. The MG drive control section 821 controls the drive of the main motor 70 by controlling the ON/OFF operation of the switching elements forming the inverter 71. The stagnation determination section 822 determines a stagnation of the actuator 40 based on a detected value θsns of the position sensor 68.

In the present embodiment, the act-ECU 81 and the MG-ECU 82 are provided separately, but they may be configured as one ECU. Also, the act-ECU 81 may be provided integrally with the actuator 40. Further, for example, the stagnation determination section 822 may be provided on the act-ECU 81 side, and various determination processes described later may be executed by either the act-ECU 81 or the MG-ECU 82.

Figure 6:
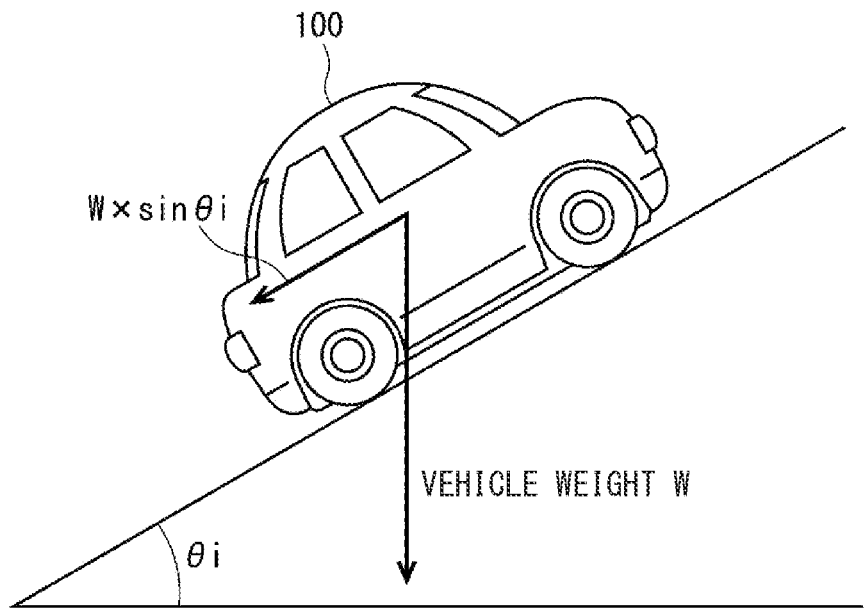
FIG. 6 is an explanatory diagram explaining a state in which the vehicle is tilted.
Figure 7:
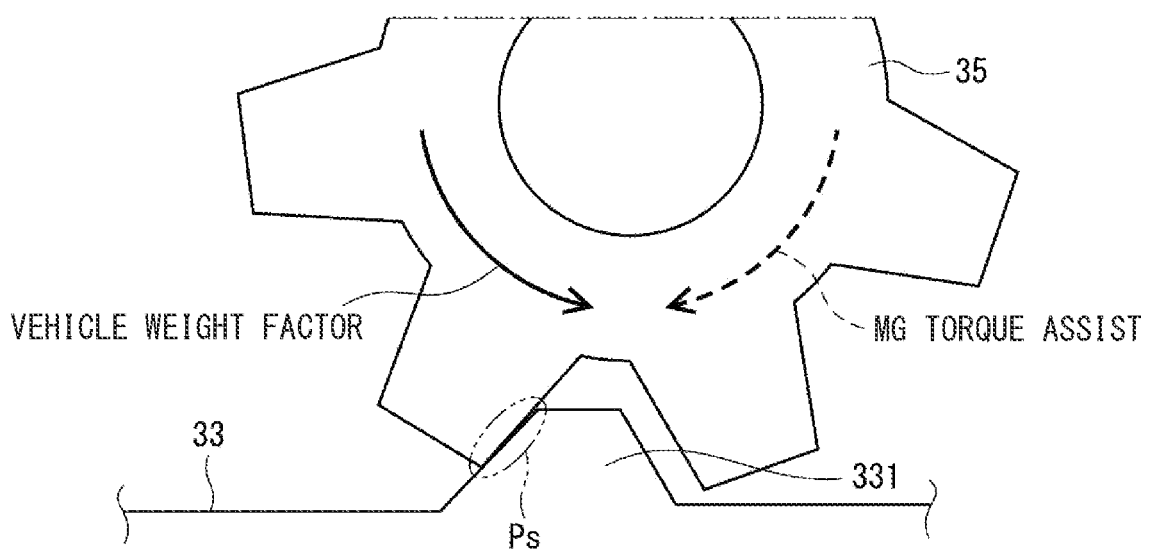
FIG. 7 is a schematic diagram explaining a meshing surface pressure in the parking lock mechanism.

As described above, the parking lock is released by driving the motor 50. As shown in FIG. 6, when the vehicle 100 is stopped in an inclined state, a load L (see formula (1)) corresponding to a vehicle weight W and an inclination angle θi is applied to the vehicle 100 in a longitudinal direction. As shown in FIG. 7, the load L corresponding to the vehicle weight W and the inclination angle θi is applied to a surface pressure generating portion Ps where the parking lever 33 and the parking gear 35 mesh.

$$L = W \times \sin \theta i \qquad (1)$$

Therefore, when pulling out the parking lever 33 from the parking gear 35, if the vehicle 100 is stopped in the inclined state, a larger torque is required due to the meshing load than when the vehicle is stopped on a flat road. Hereinafter, pulling out the protrusion 331 of the parking lever 33 from the parking gear 35 will be referred to as "P removal".

Figure 8:
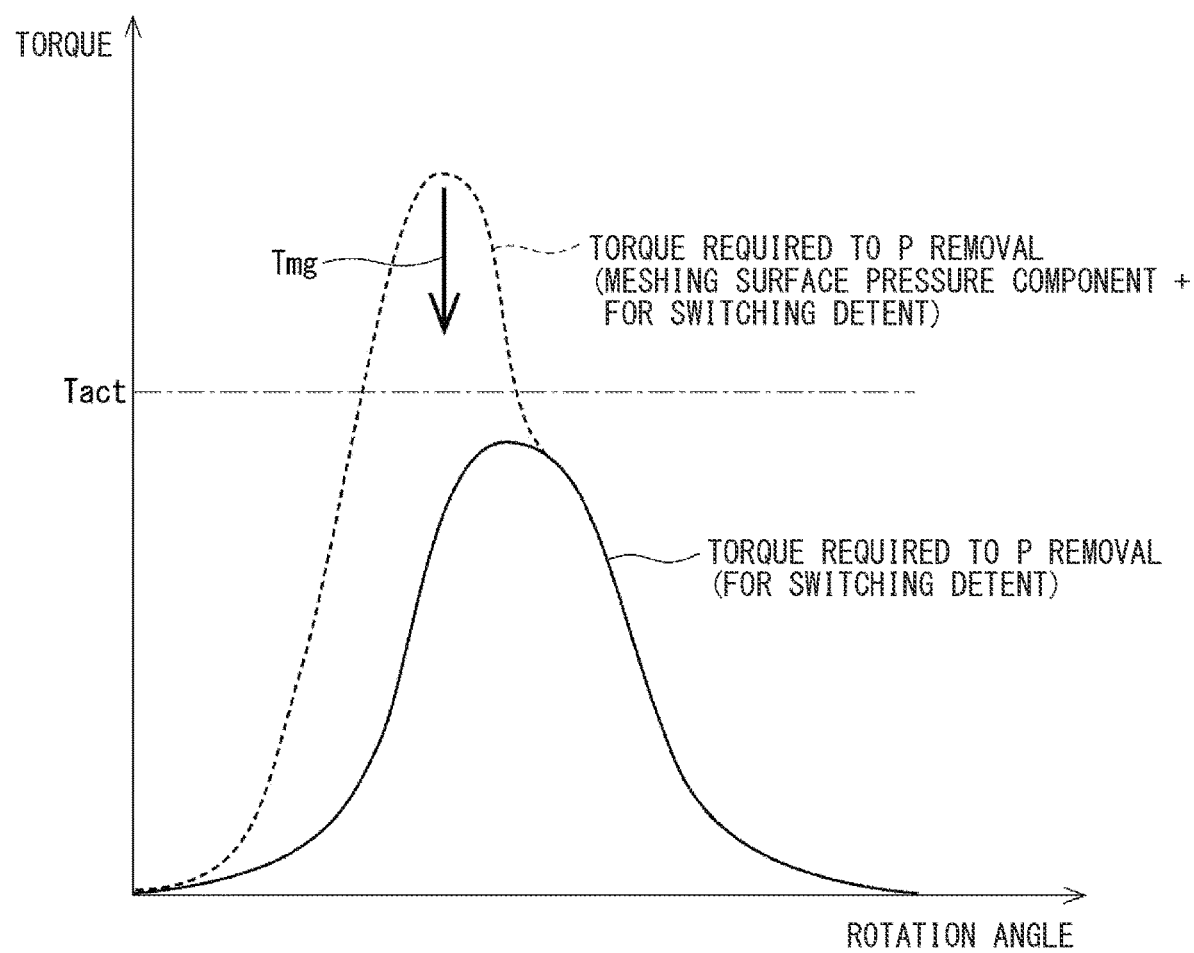
FIG. 8 is an explanatory diagram explaining a torque required to a P removal.

In FIG. 8, a horizontal axis represents the rotation angle of the actuator 40, and a vertical axis represents the torque of the actuator 40. As shown in FIG. 8, when performing the P removal in a state where the meshing surface pressure is applied, in addition to the torque for switching the detent of the detent mechanism 20 shown by the solid line, the torque of the meshing surface pressure component shown by the broken line is required. Therefore, when the torque that can be output by the actuator 40 is relatively small, for example, as indicated by the dashed line, there is a possibility that the output torque Tact of the actuator 40 alone may not be enough to perform the P removal. Further, when the torque of the meshing surface pressure component is compensated by the actuator 40, a physical size of the actuator 40 is increased.

Figure 9:
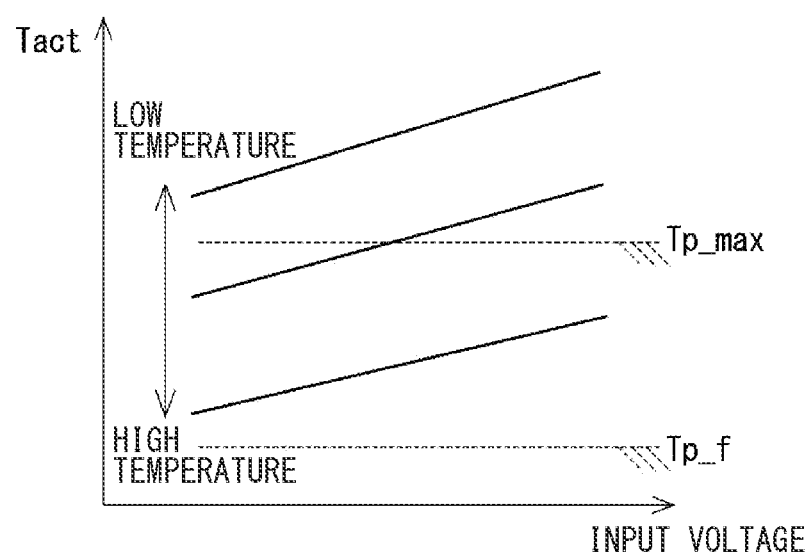
FIG. 9 is an explanatory diagram explaining the output torque of the actuator according to the first embodiment.
Figure 10:
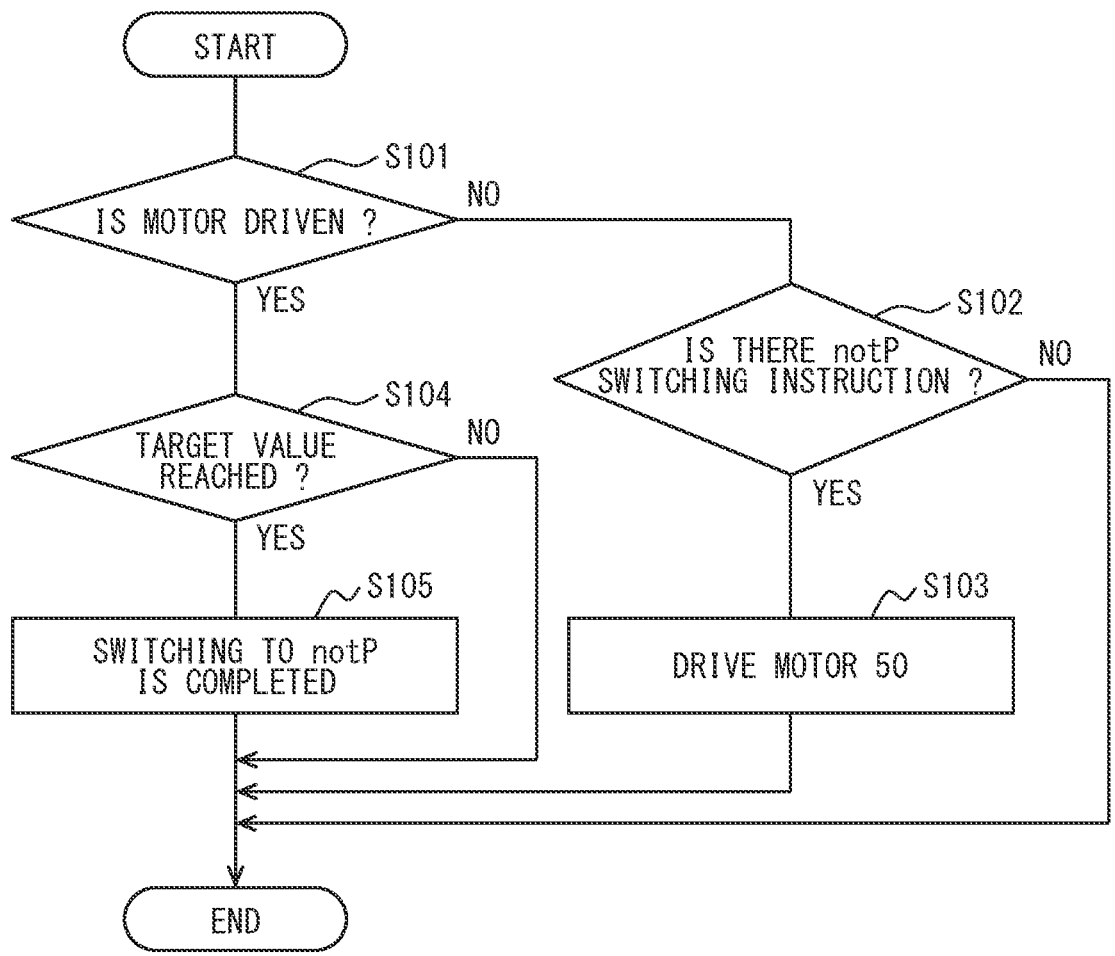
FIG. 10 is a flowchart explaining an actuator control process according to the first embodiment.

In FIG. 9, the horizontal axis represents an input voltage V of the actuator 40, and the vertical axis represents an output torque Tact of the actuator 40. The torque required to perform the P removal on a flat road is represented by Tp_f, and the torque required to perform the P removal on the assumed maximum slope is represented by Tp_max. In the actuator 40, when the temperature is high and the voltage is low, the output torque Tact of the actuator 40 decreases. Therefore, depending on the inclining state of the vehicle, the temperature condition, and the input voltage V, there is a region where the P removal cannot be performed only by the torque of the motor 50.

Therefore, in the present embodiment, the main motor 70 is driven as necessary when the P removal is performed to generate torque that cancels the torque of the meshing surface pressure component. As a result, it is possible to reduce the meshing surface pressure component due to the vehicle weight by the MG torque Tmg. Therefore, the torque required for the motor 50 can be reduced and the size of the motor 50 can be reduced as compared with the case where the P removal is performed only by the motor 50. In addition, it is possible to reduce the energization amount and heat load of a drive circuit (not shown) for driving the motor 50.

In the present embodiment, the driving of the motor 50 and the main motor 70 is controlled based on the detected value θsns of the position sensor 68. An actuator control processing will be described based on the flowchart of FIG. 10. This processing is executed at a predetermined cycle by the actuator drive control section 811 when the shift range is the P range. Hereinafter, "step" in step S101 is omitted, and is simply referred to as a symbol "S".

In S101, the actuator drive control section 811 determines whether the motor 50 is being driven. When it is determined that the motor 50 is being driven (S101: YES), the process proceeds to S104. When it is determined that the motor 50 is not being driven (S101: NO), the process proceeds to S102.

In S102, the actuator drive control section 811 determines whether or not there is a notP switching instruction. Here, the actuator drive control section 811 determines based on the switching instruction from the MG-ECU 82, but the determination may be made internally based on the shift signal or the like. When it is determined that there is no notP switching instruction (S102: NO), the process of S103 is skipped. When it is determined that there is the notP switching instruction (S102: YES), the process proceeds to S103.

In S103, the actuator drive control section 811 sets a target value θ* that allows switching from the P range to the notP range, and drives the motor 50 so that the detected value θsns of the position sensor 68 becomes the target value θ*.

In S104, which is shifted to when it is determined that the motor 50 is being driven (S101: YES), the actuator drive control section 811 determines whether or not the detected value θsns of the position sensor 68 has reached the target value θ*. When it is determined that the detected value θsns has not reached the target value θ* (S104: NO), the drive control for the motor 50 is continued. When it is determined that the detected value θsns has reached the target value θ* (S104: YES), the process proceeds to S105, the actuator drive control section 811 determines that the switching to the notP range has been completed, and stops the motor 50. In addition, the act-ECU 81 transmits to MG-ECU 82 information indicating that the switching has been completed.

The MG control processing will be described based on the flowchart of FIG. 11. This processing is executed at a predetermined cycle by MG-ECU 82 when the shift range is the P range.

In S201, the MG-ECU 82 determines whether or not there is a notP switching request. When it is determined that there is no notP switching request (S201: NO), the process after S202 is skipped. When it is determined that there is the notP switching request (S201: YES), the process proceeds to S202.

In S202, the MG-ECU 82 determines whether or not the motor 50 (denoted as "act" in the figure) is being driven. When it is determined that the motor 50 is not being driven (S202: NO), the process proceeds to S203 and transmits a notP switching instruction to the act-ECU 81. When it is determined that the motor 50 is being driven (S202: YES), the process proceeds to S204.

In S204, the stagnation determination section 822 determines whether or not the detected value θsns of the position sensor 68 is stagnant. Here, when the maximum value of the detected value θsns is not updated, it is determined that the detected value θsns is stagnant. When it is determined that the detected value θsns is stagnant (S204: YES), the process proceeds to S207. When it is determined that the detected value θsns is not stagnant (S204: NO), the process proceeds to S205.

In S205, the MG drive control section 821 determines whether or not the MG torque Tmg is equal to or less than a traveling torque Td. When the set traveling torque is 0, then the traveling torque Td is 0. When it is determined that the MG torque Tmg is equal to or less than the traveling torque Td (S205: YES), the process proceeds to S215. When the traveling torque Td is not 0 and the MG torque Tmg is smaller than the traveling torque Td, the MG torque Tmg is controlled by separate processing. When it is determined that the MG torque Tmg is greater than the traveling torque Td (S205: NO), the process proceeds to S206.

In S206, the stagnation determination section 822 determines whether or not the detected value θsns is within the P range release region. In the present embodiment, the range between a P range release position θy and the switching completion position is defined as the P range release region. When it is determined that the detected value θsns is within the P range release region (S206: YES), the process proceeds to S214 to decrease the MG torque Tmg. When it is determined that the detected value θsns has not reached the P-range release region (S206: NO), the process proceeds to S207.

In S207, the stagnation determination section 822 determines whether or not a stagnation count value C1 is equal to or less than a stagnation determination threshold value Cth1 corresponding to a stagnation determination time Xth1. When it is determined that the stagnation count value C1 is equal to or less than the stagnation determination threshold value Cth1 (S207: YES), the process proceeds to S208, and the stagnation count value C1 is counted up. When it is determined that the stagnation count value C1 is greater than the stagnation determination threshold value Cth1 (S207: YES), the process proceeds to S209.

In S209, the MG drive control section 821 determines whether or not the MG torque Tmg has reached an initial torque value Ts. The initial torque value Ts is a value that can reduce the meshing surface pressure, and is set to a value that allows the motor 50 to start moving, for example. Also, the initial torque value Ts may be a learning value. When it is determined that the MG torque Tmg has not reached the initial torque value Ts (S209: NO), the process proceeds to S210 and the MG torque command value Tmg* is set to the initial torque value Ts. When it is determined that the MG torque Tmg has reached the initial torque value Ts (S209: YES), the process proceeds to S211.

In S211, the MG drive control section 821 determines whether or not the MG torque Tmg has reached the upper limit torque value Tu. The upper limit torque value Tu is the maximum torque in the meshing surface pressure reduction control, and is set to a value that allows the meshing surface pressure to be reduced so that the actuator 40 operates reliably. When it is determined that the MG torque Tmg has not reached the upper limit torque value Tu (S211: NO), the process proceeds to S212 to increase the MG torque command value Tmg* by a gradual change amount ΔT. When it is determined that the MG torque Tmg has reached the upper limit torque value Tu (S211: YES), the process proceeds to S213 to set the MG torque command value Tmg* to the upper limit torque value Tu.

In S215, the MG-ECU 82 determines whether or not switching to the notP range has been completed. When it is determined that the switching to the notP range has not been completed (S215: NO), the current state is maintained. When it is determined that the switching to the notP range has been completed (S215: YES), the process proceeds to S216, and the surface pressure reduction control when performing the P removal is completed.

Figure 12:
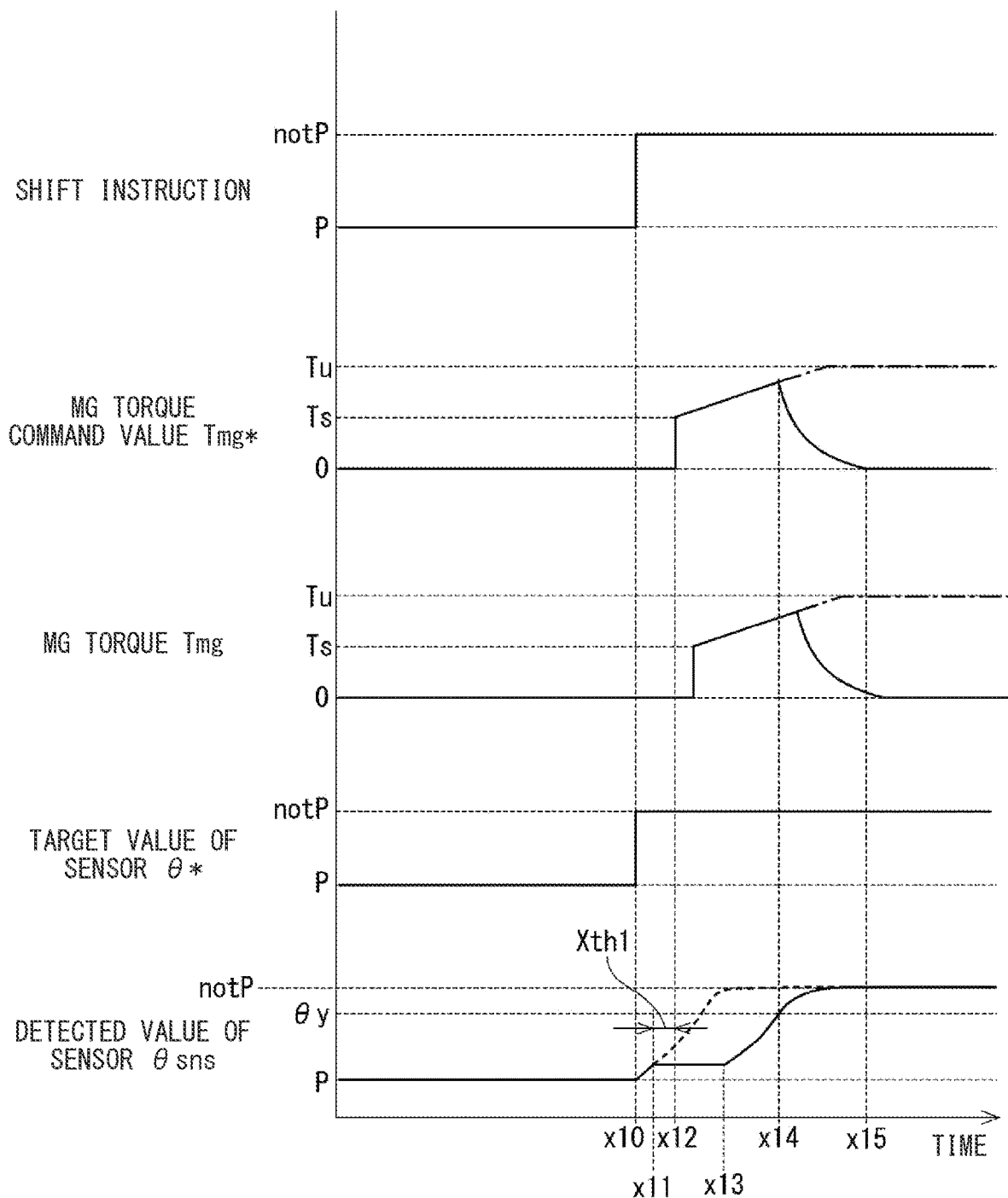
FIG. 12 is a time chart illustrating a control processing of the P removal according to the first embodiment.

The P removal control processing will be described based on the time chart of FIG. 12. In FIG. 12, the horizontal axis represents a common time axis, and the vertical axis represents, from the top, a shift instruction, a MG torque command value Tmg*, a MG torque Tmg, a target value of the position sensor 68, and the detected value θsns of the position sensor 68. The value of the position sensor 68 is described as corresponding ranges where appropriate. Further, the description will be made assuming that the traveling torque Td is equal to 0 (Td=0) during performing the P removal. The same applies to the time chart according to the embodiment described later.

At time x10, when the shift instruction is switched from the P range to the not P range, the driving of the motor 50 is started. When the meshing surface pressure is not generated, the motor 50 does not stagnate, and the P removal is completed by the torque of the motor 50, as indicated by the dashed line.

When there is a meshing surface pressure that makes it impossible to perform the P removal due to the torque of the motor 50, at time x11, the detected value θsns of the position sensor 68 stagnates at a position where the detected value θsns is smaller than the P range release position θy.

At time x12 when the stagnation determination time Xth1 has elapsed from time x11, it is determined that the actuator 40 is stagnate. The MG torque command value Tmg* is set to the initial torque value Ts, and the main motor 70 is driven. Also, the MG torque command value Tmg* is gradually increased. The MG torque Tmg follows the change in the MG torque command value Tmg* with a delay, but the details of following with a delay will be omitted.

At time x13, the stagnation of the actuator 40 is resolved, and at time x14, when the detected value θsns reaches the P range release position θy, the MG torque command value Tmg* is decreased. When the stagnation of the actuator 40 is not resolved, the MG torque command value Tmg* is increased to the upper limit torque value Tu, as indicated by the dashed line. Alternatively, the initial torque value Ts may be set to 0, and the MG torque Tmg may be gradually increased from a state in which the main motor 70 is stopped. Alternatively, the initial torque value Ts may be equal to the upper limit torque value Tu, and the upper limit torque value Tu may be output from time x12.

The MG torque command value Tmg* is set to 0 at time x15 when the range switching is completed. In the example of FIG. 12, the timing of the completion of the range switching and the timing of the MG torque command value Tmg* becoming 0 are approximately the same. However, the MG torque command value Tmg* may become 0 before the range switching is completed.

In the present embodiment, when the meshing surface pressure is generated in the parking lock mechanism 30 due to the inclination of the vehicle or the like, based on the detected value θsns of the position sensor 68 provided on the actuator 40 side, it is determined whether the meshing surface pressure reduction control by the main motor 70 is to be started. As a result, it is possible to quickly determine whether the actuator 40 is stagnant, shorten the time until the start of the surface pressure reduction control by the main motor 70, and improve the responsiveness. In addition, heat generation of the motor 50 due to stagnation and heat generation of elements related to the driving of the motor 50 can be suppressed.

Further, in the present embodiment, the MG torque Tmg is reduced at the stage when the detected value θsns reaches the P range release position θy before the range switching completion. Thereby, heat generation of the main motor 70 can be suppressed as compared with the case where the MG torque Tmg is increased or maintained until the range switching is completed.

As described above, the vehicle control device 80 controls the vehicle drive system 90 including the main motor 70 that is the driving source of the vehicle 100, the parking lock mechanism 30 and the actuator 40. The parking lock mechanism 30 has the parking gear 35 connected to the axle 95 and the parking lever 33 that can be engaged with the parking gear 35. The engagement of the parking gear 35 and the parking lever 33 allows the axle 95 to be locked. The actuator 40 can drive the parking lever 33. The actuator 40 of the present embodiment has a usage environment region where the parking lock cannot be released when the meshing surface pressure is generated.

The vehicle control device 80 includes the actuator drive control section 811 that controls drive of the actuator, the MG drive control section 821 that controls drive of the main motor 70, and the stagnation determination section 822. The stagnation determination section 822 determines stagnation of the actuator 40 based on the detected value of the sensor unit that detects the physical quantity that changes according to the drive state of the actuator 40. The sensor unit of the present embodiment is the position sensor 68 that detects the rotation angle of the actuator 40.

When performing the meshing surface pressure reduction control for reducing the meshing surface pressure generated at the meshing point between the parking gear 35 and the parking lever 33 by driving the main motor 70, the MG drive control section 821 decreases the MG torque Tmg which is the torque of the main motor 70 based on the detected value of the sensor unit. Specifically, the MG drive control section 821 starts reducing the MG torque Tmg when it is determined that the stagnation of the actuator 40 has been resolved based on the detected value of the sensor unit.

As a result, the actuator 40 can be miniaturized, and the P removal can be reliably performed. Moreover, heat generation in the main motor 70 can be suppressed by reducing the MG torque Tmg based on the signal that changes according to the driving of the actuator 40. Moreover, it is possible to prevent the occurrence of a shock due to the parking lever 33 colliding with the opposite side of the parking gear 35.

The stagnation determination section 822 determines that the stagnation of the actuator 40 has been resolved when the detected value of the position sensor 68 reaches the P range release position θy. Thereby, heat generation of the main motor 70 can be suppressed as compared with the case where the MG torque Tmg is increased or maintained until the range switching is completed. Further, by decreasing the MG torque Tmg after operating the actuator 40 to a position where there is no effect of load torque increase due to vehicle weight factor, it is possible to prevent the failure of P removal.

Second Embodiment

Figure 13:
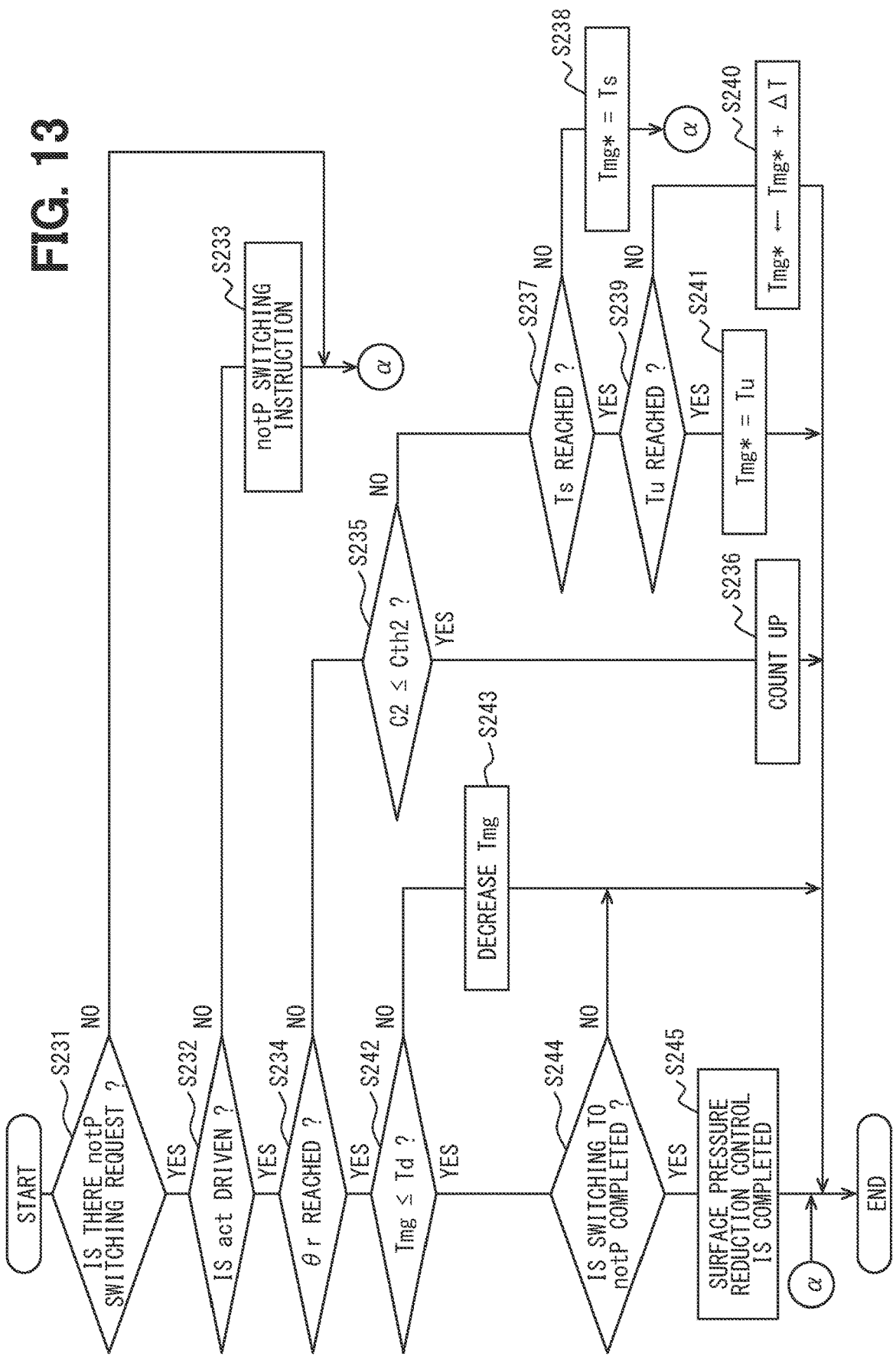
FIG. 13 is a flowchart illustrating MG control processing according to a second embodiment.
Figure 14:
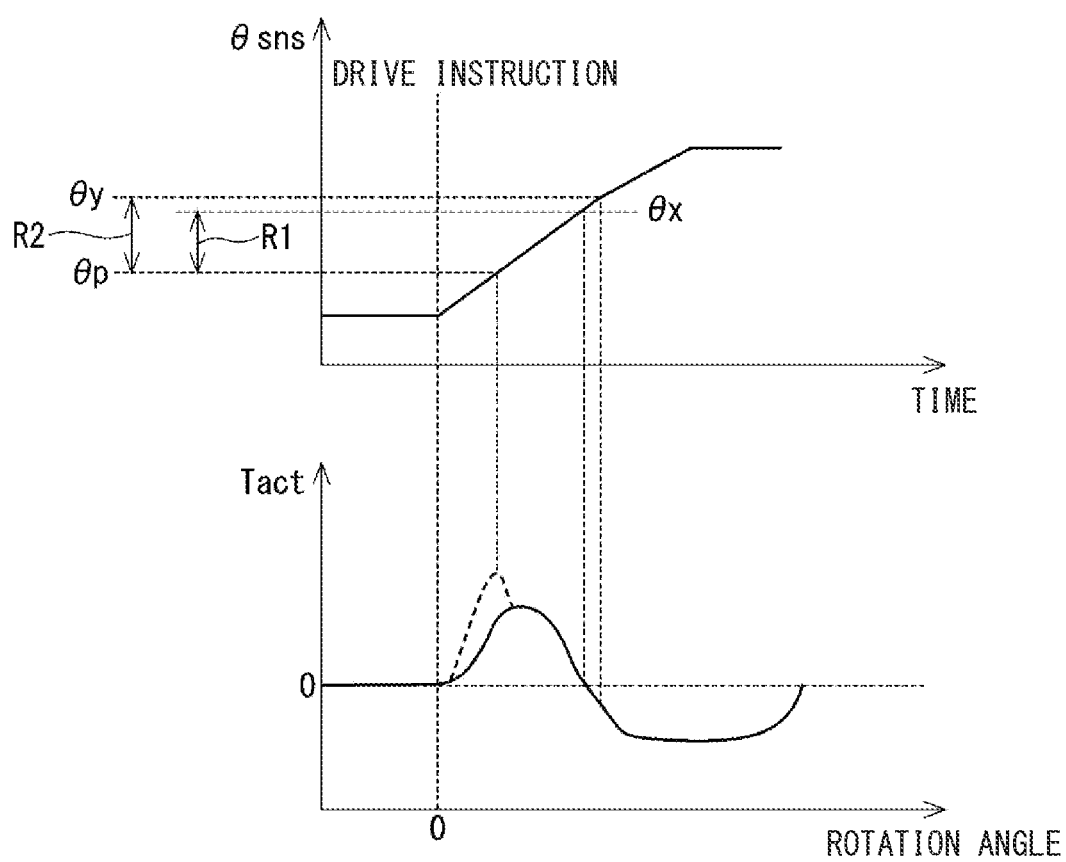
FIG. 14 is an explanatory diagram explaining a setting of a reach determination value according to the second embodiment.
Figure 15:
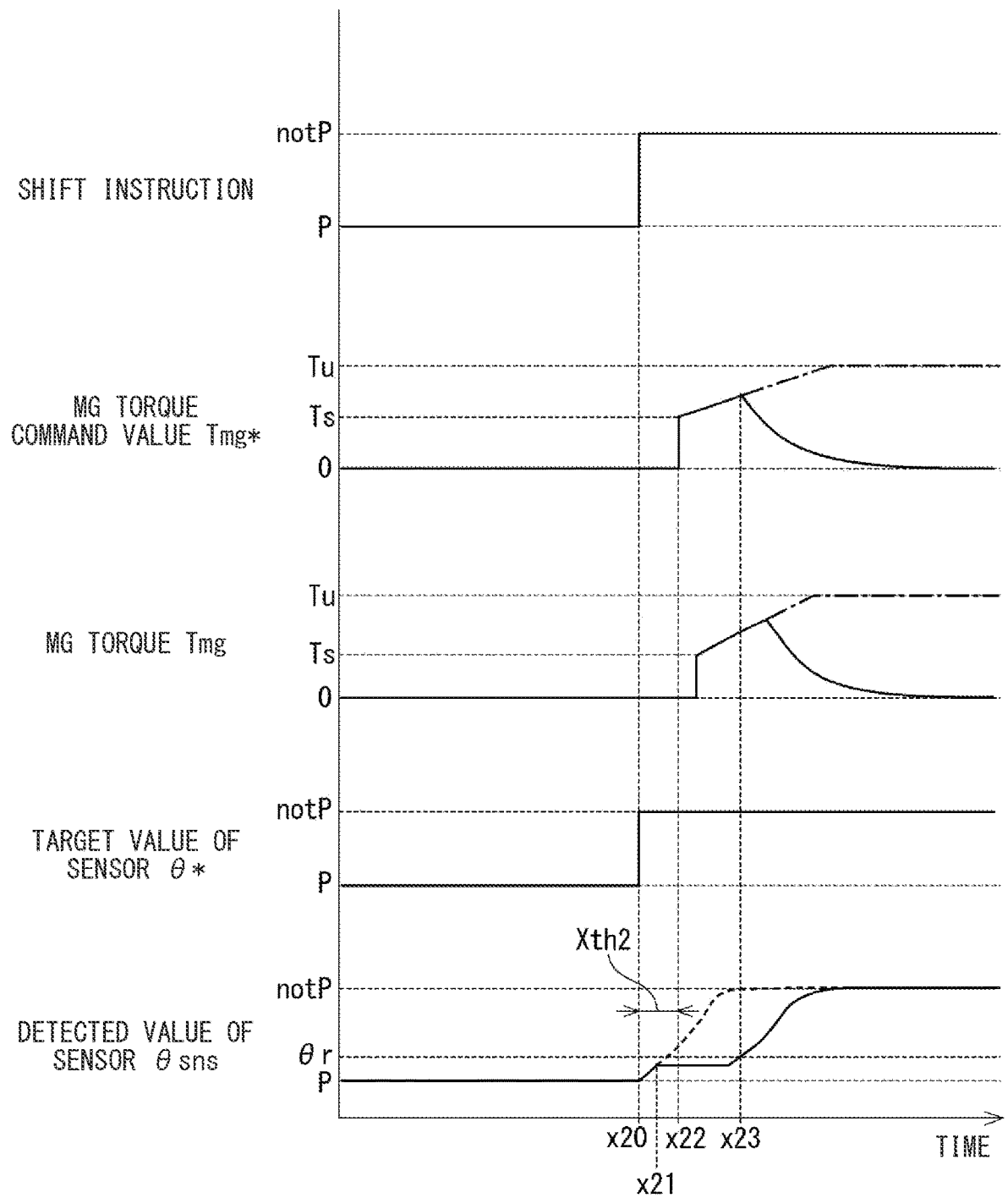
FIG. 15 is a time chart explaining the control processing of the P removal according to the second embodiment.

A second embodiment is shown in FIGS. 13 to 15. Since a second embodiment to a fifth embodiment mainly differ in the processing of the main motor 70, this point will be mainly described. In the MG control processing shown in the flowchart of FIG. 13, the processes of S231 to S233 are the same as the processes of S201 to S203 in FIG. 11.

In S234 to which the process proceeds when an affirmative determination is made in S232, the stagnation determination section 822 determines whether or not the detected value θsns of the position sensor 68 has reached an arrival determination value θr. The arrival determination value θr will be described with reference to FIG. 14. FIG. 14 shows the detected value θsns of the position sensor 68 in an upper part and the output torque Tact of the motor 50 in a lower part. The output torque Tact is indicated by a solid line when no meshing surface pressure is generated, and by a broken line when the meshing surface pressure is generated.

As shown in the lower part of FIG. 14, the motor shaft precedes the output shaft 15 until the detent roller 26 gets over the peak portion 215 of the detent plate 21. When the detent roller 26 gets over the peak portion 215, the output shaft 15 precedes due to the spring force of the detent spring 25, so the output torque Tact becomes negative. The detected value θsns of the position sensor 68 at the timing at which the detent roller 26 gets over the peak portion 215 is defined as a suction start position θx, and the detected value θsns that becomes the peak of the meshing surface pressure is defined as a peak position θp. The arrival determination value θr is set within a range R1 between the peak position θp and the suction start position θx. Also, the arrival determination value θr may be set within a range R2 between the peak position θp and the P range release position θy where the P range is released. The P range release position θy is a position where the detected value of the range sensor 37 switches from P to notP.

Returning to FIG. 13, when it is determined that the detected value θsns has reached the arrival determination value θr (S234: YES), the process proceeds to S242. Also, when the detected value θsns has passed the arrival determination value Or, an affirmative determination is made. That is, when the detected value θsns has passed the arrival determination value θr by driving the motor 50, stagnation due to the meshing surface pressure component does not occur, so the P removal can be performed without driving the main motor 70. When it is determined that the detected value θsns has not reached the arrival determination value θr (S234: NO), the process proceeds to S235.

In S235, the stagnation determination section 822 determines whether or not the count value C2 is equal to or less than the arrival determination threshold value Cth2 set according to the arrival determination time Xth2. The reach determination time Xth2 in the present embodiment is set according to the time required to reach the arrival determination value θr when no meshing surface pressure is generated. When it is determined that the count value C2 is equal to or less than the arrival determination threshold value Cth2 (S235: YES), the process proceeds to S236 and counts up the count value C2. When it is determined that the count value C2 is greater than the arrival determination threshold value Cth2 (S235: NO), the process proceeds to S237.

Figure 11:
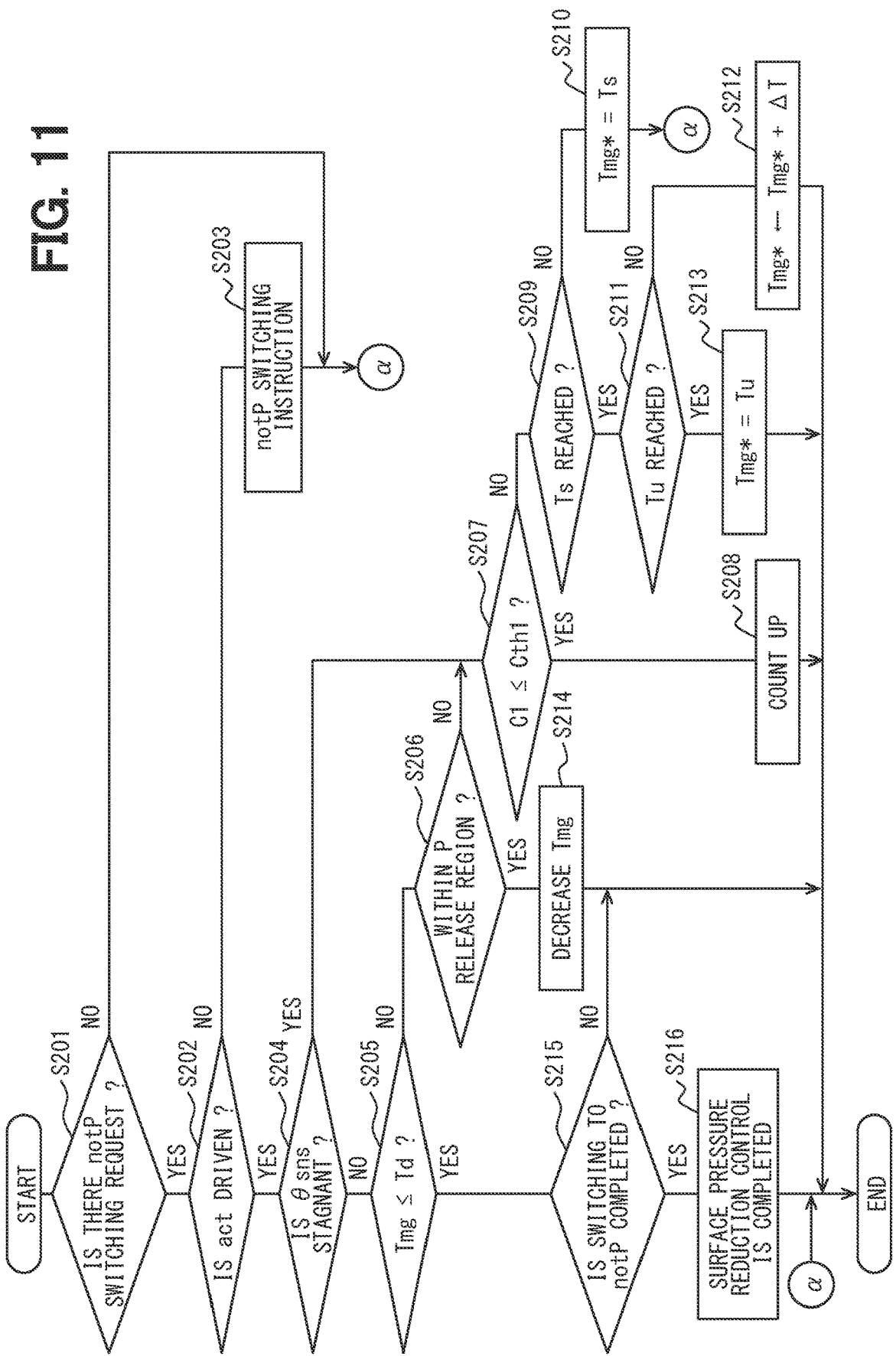
FIG. 11 is a flowchart illustrating a MG control process according to the first embodiment.

The process of S242 is the same as the process of S205 in FIG. 11, and when the determination is negative, the process proceeds to S243, and when the determination is affirmative, the process proceeds to S244. The processes of S243 to S245 are the same as the processes of S214 to S216 in FIG. 11.

The P removal control processing of the present embodiment will be described based on the time chart of FIG. 15. At time x20, when the shift instruction is switched from the P range to the not P range, the motor 50 is started to be driven and the clock is started. At time x21, the detected value θsns of the position sensor 68 is stagnant before the arrival determination value θr. At time x22 when the arrival determination time Xth2 has elapsed since the start of driving the motor 50, the stagnant state continues, so the driving of the main motor 70 is started. At time x23, when the detected value θsns of the position sensor 68 reaches the arrival determination value θr, a reduction of the MG torque command value Tmg* is started. The processing after the start of MG torque reduction is the same as in the above-described embodiment, so description thereof will be omitted.

The vehicle drive system 90 includes the detent mechanism 20. The detent mechanism 20 includes the detent plate 21 formed with the plurality of valley portions 211 and 212 and connected to the parking lever 33, the detent roller 26 capable of moving the valley portions 211 and 212 by driving the actuator 40, and the detent spring 25 that biases the detent roller 26 in a direction to fit into the valley portions 211 and 212.

The arrival determination value θr is set between the peak position θp at which the meshing surface pressure due to the load applied to the axle 95 peaks, and the suction start position θx which is a position where the detent roller 26 can be moved by the biasing force of the detent spring 25 to the valley portion 212 corresponding to the notP range, which is a range other than the P range.

Also, the arrival determination value θr may be set between the peak position θp at which the meshing surface pressure due to the load applied to the axle 95 peaks and the P range release position θy at which the P range is released. As a result, the MG torque Tmg can be reduced at the timing when the stagnation of the actuator 40 is resolved, and heat generation of the main motor 70 can be suppressed. In addition, the same effects as that of the embodiment described above can be obtained.

Third Embodiment

Figure 16:
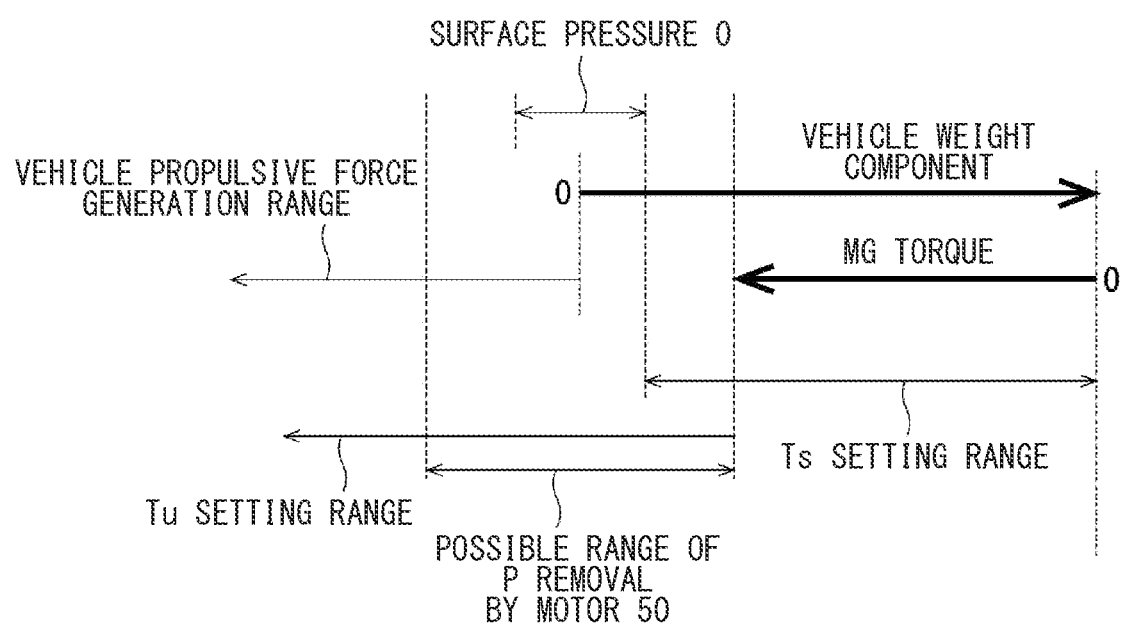
FIG. 16 is an explanatory diagram conceptually explaining setting ranges of an initial torque value and an upper limit torque value according to a third embodiment.
Figure 17:
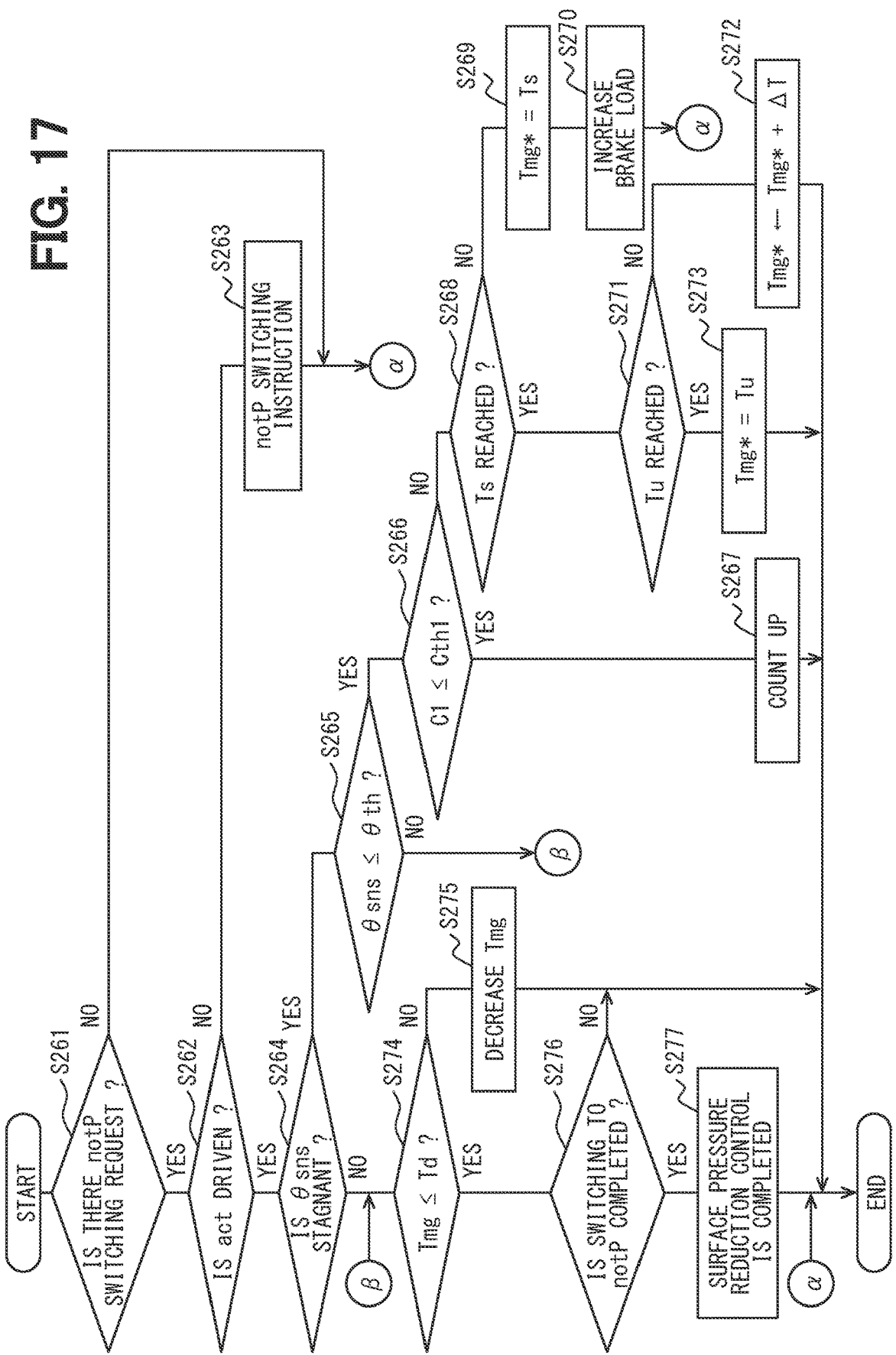
FIG. 17 is a flowchart illustrating MG control processing according to the third embodiment.
Figure 18:
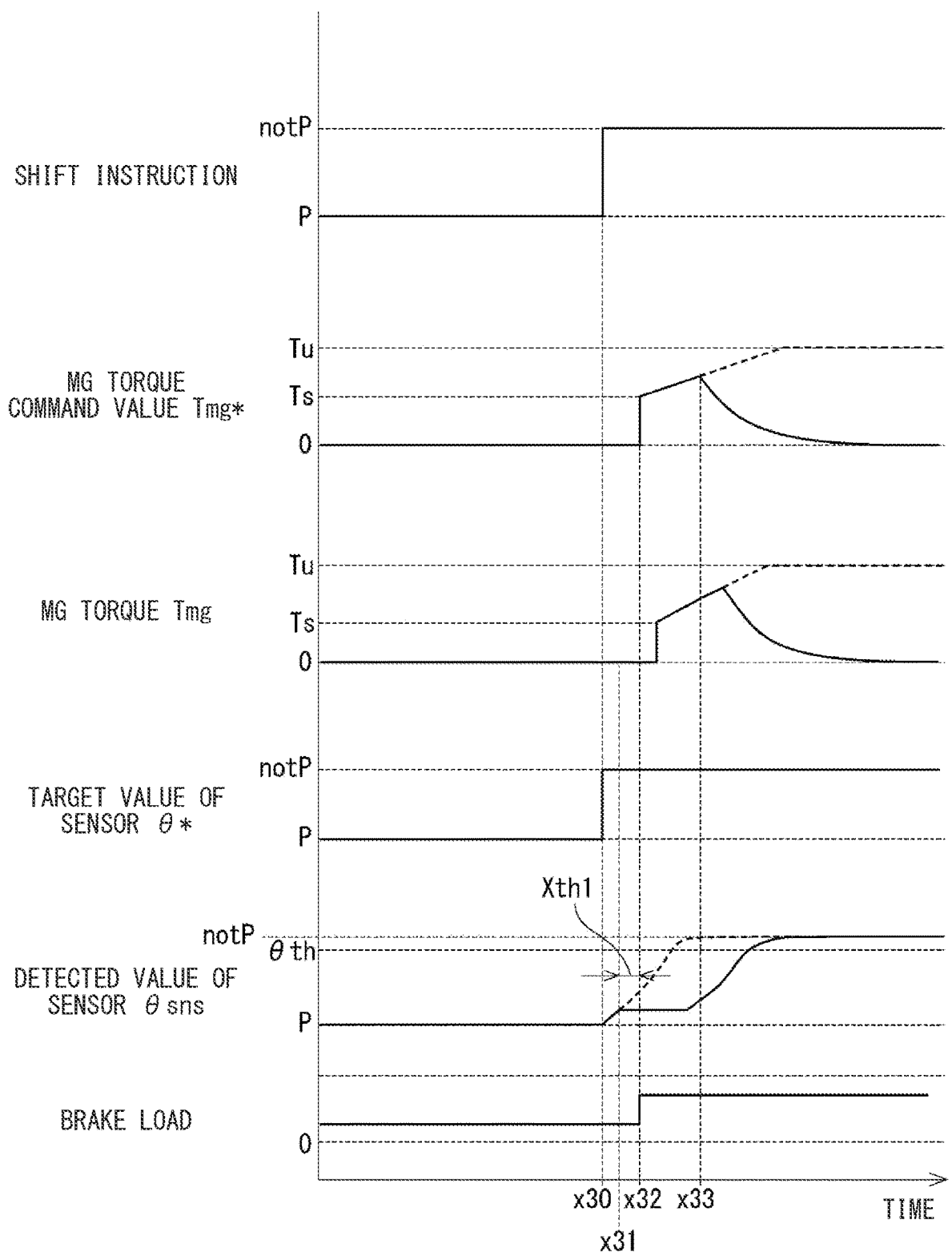
FIG. 18 is a time chart illustrating a control processing of the P removal according to the third embodiment.

A third embodiment is shown in FIGS. 16 to 18. FIG. 16 is a diagram conceptually explaining setting ranges of the initial torque value Ts and the upper limit torque value Tu. The fitting position of the protrusion 331 of the parking lever 33 is arbitrary within the range of backlash, and when it is positioned within the range of backlash, no surface pressure is generated. Further, when the protrusion 331 and the parking gear 35 come into contact with each other due to the inclination of the vehicle 100 or the like, the meshing surface pressure corresponding to the vehicle weight component is generated (see FIG. 8).

Therefore, the main motor 70 is driven so as to reduce the meshing surface pressure generated due to the vehicle weight factor. The initial torque value Ts is set to 0 or more and a range where the surface pressure is 0. Further, the upper limit torque value Tu is set so that the residual vehicle weight component, which is the difference between the vehicle weight component and the MG torque Tmg, falls within the range in which the P removal can be performed by the motor 50 or exceeds the range.

Here, when the MG torque Tmg becomes larger than the vehicle weight component, a propulsive force generates in the vehicle 100. Therefore, in the present embodiment, the braking force is increased so that the vehicle 100 does not unintentionally start by driving the main motor 70 in the P removal control. Also in the first embodiment and the like, when the main motor 70 is driven by the meshing surface pressure reduction control, the brake load may be increased.

The MG control processing of the present embodiment will be described based on the flowchart of FIG. 17. The processes of S261 to S264 are the same as the processes of S201 to S204 in FIG. 11. When the determination in S264 is affirmative, the process proceeds to S265, and if the determination is negative, the process proceeds to S274.

In S265, the stagnation determination section 822 determines whether or not the detected value θsns is equal to or less than an implementation determination threshold value θth. The implementation determination threshold value θth is set, for example, according to the P range release position θy at which the range sensor 37 switches from the P range to the notP range. When it is determined that the detected value θsns is greater than the implementation determination threshold value θth (S265: NO), the process proceeds to S274. When the detected value θsns is greater than the implementation determination threshold value θth, there is a high probability that the stagnation is caused by a factor other than the meshing surface pressure such as a mechanical lock. Therefore, the meshing surface pressure reduction processing by the MG torque is not performed. When it is determined that the detected value θsns is equal to or less than the implementation determination threshold value θth (S265: YES), the process proceeds to S266.

The processes of S266 to S269 are the same as the processes of S207 to S210 in FIG. 11. In S270 subsequent to S269, the vehicle control device 80 transmits to the brake ECU 85 a command to increase the brake load. When the brake load is not increased in the meshing surface pressure reduction processing, the process of S270 may be omitted.

The processes of S271 to S273 are the same as the processes of S211 to S213 in FIG. 11. The process of S274 to be proceeded when the negative determination is made in S264 is the same as the process of S205 in FIG. 11, and when the determination is negative, the process proceeds to S275, and when the determination is affirmative, the process proceeds to S276. The processes of S275 to S277 are the same as the processes of S214 to S216 in FIG. 11.

The P removal control processing of the present embodiment will be described based on the time chart of FIG. 18. In FIG. 18, the horizontal axis represents a common time axis, and the vertical axis represents, from the top, a shift instruction, a MG torque command value Tmg*, a MG torque Tmg, a target value of the position sensor 68, and the detected value θsns of the position sensor 68. The processes of time x30 to time x32 are the same as the processes of time x10 to time x12 in FIG. 12. Also, at time x32, the brake load is increased.

At time x33, when the stagnation of the actuator 40 is resolved and the stagnation of the position sensor 68 is resolved, the MG torque command value Tmg* is decreased. The processing after the start of MG torque reduction is the same as in the above-described embodiment, so description thereof will be omitted. Also, in FIG. 18, the state in which the brake load is increased continues, but at time x35, the brake load may be returned to the brake load before increasing the brake load.

In the present embodiment, the vehicle control device 80 increases the brake load when the main motor 70 is driven by the meshing surface pressure reduction control, compared to when the meshing surface pressure reduction control is not performed. As a result, unintended starting of the vehicle 100 can be prevented. In addition, the same effects as that of the embodiment described above can be obtained.

Fourth Embodiment

Figure 19:
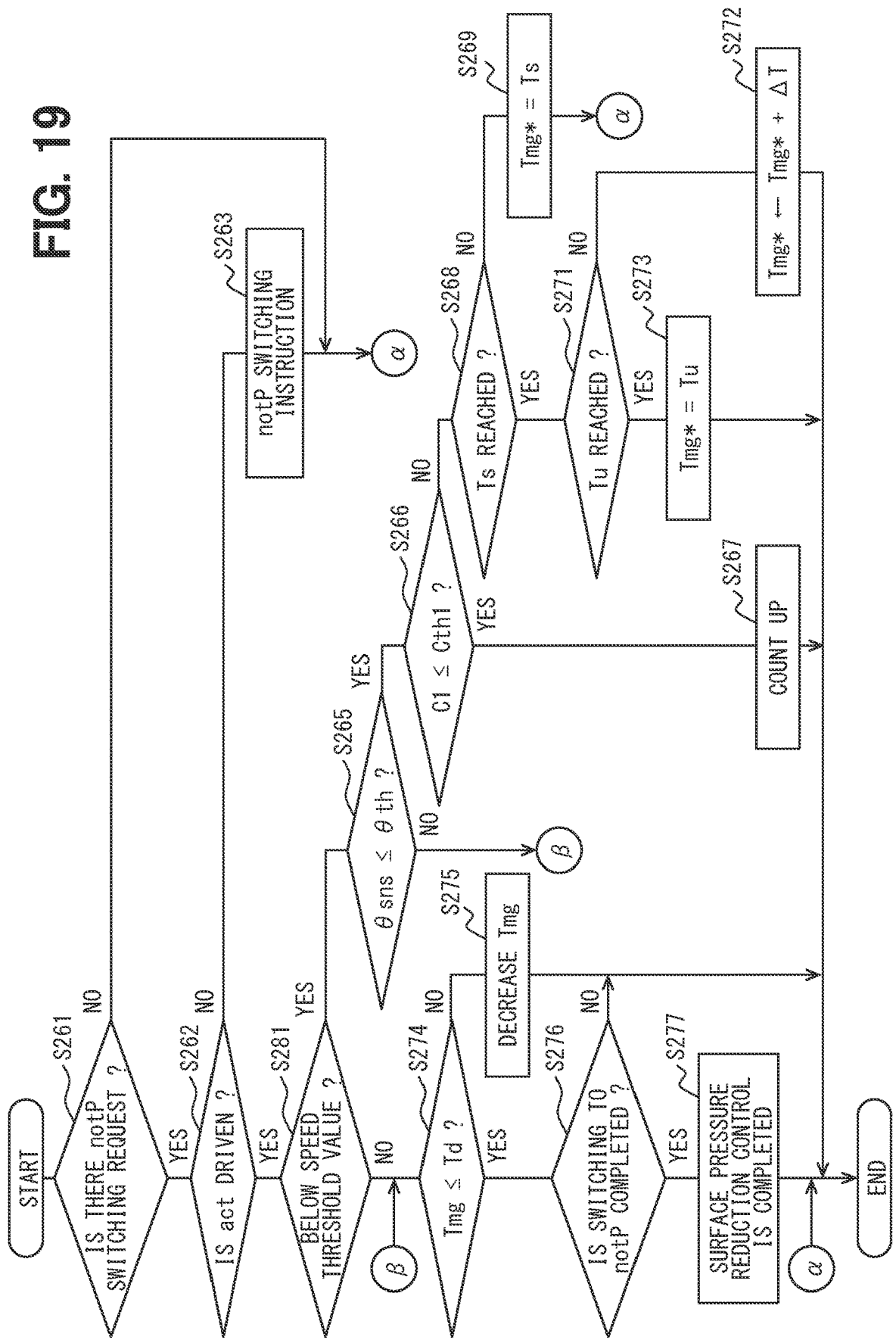
FIG. 19 is a flowchart illustrating MG control processing according to a fourth embodiment.

A fourth embodiment is shown in FIG. 19. In the MG control processing shown in the flowchart of FIG. 19, S270 of FIG. 17 is omitted, and S264 is replaced by S281. Other points are the same as those of FIG. 17.

In S281 to which the process proceeds when the determination in S262 is affirmative, it is determined whether or not the rotation speed of the actuator 40 is equal to or less than the speed threshold value based on the detected value θsns of the position sensor 68. When it is determined that the rotation speed of the actuator 40 is equal to or less than the speed threshold value (S281: YES), the process proceeds to S265. When it is determined that the rotation speed of the actuator 40 is greater than the speed threshold value (S281: NO), it is determined that the stagnation of the actuator 40 has been resolved, and the process proceeds to S274.

The stagnation determination section 822 determines that the stagnation of the actuator 40 has been resolved when the rotation speed of the actuator 40 exceeds the speed determination threshold value from the state in which the actuator 40 is stagnant. As a result, the MG torque Tmg can be reduced at the timing when the stagnation of the actuator 40 is resolved, and heat generation of the main motor 70 can be suppressed. In addition, the same effects as that of the embodiment described above can be obtained.

Fifth Embodiment

Figure 20:
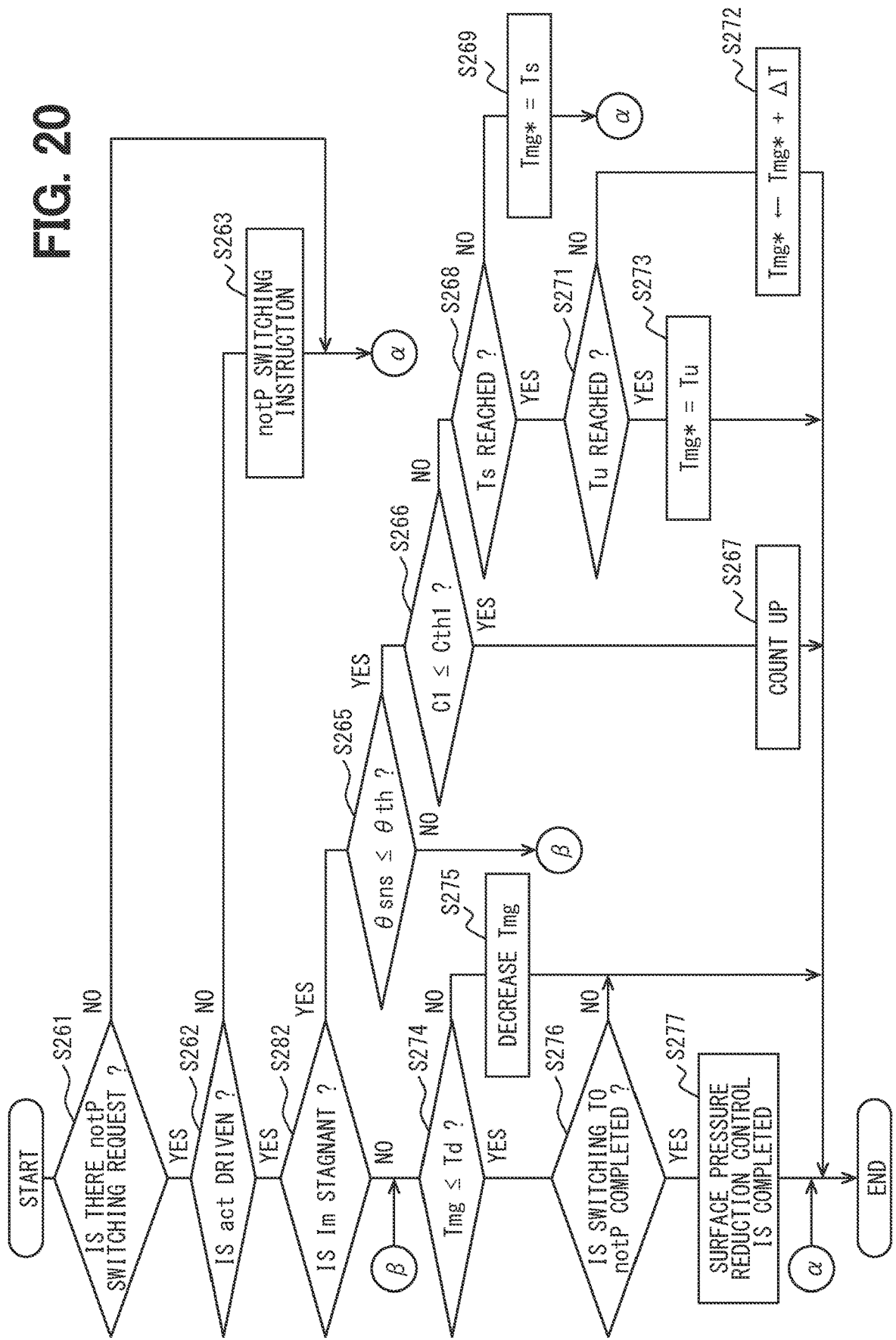
FIG. 20 is a flowchart illustrating MG control processing according to a fifth embodiment.
Figure 21:
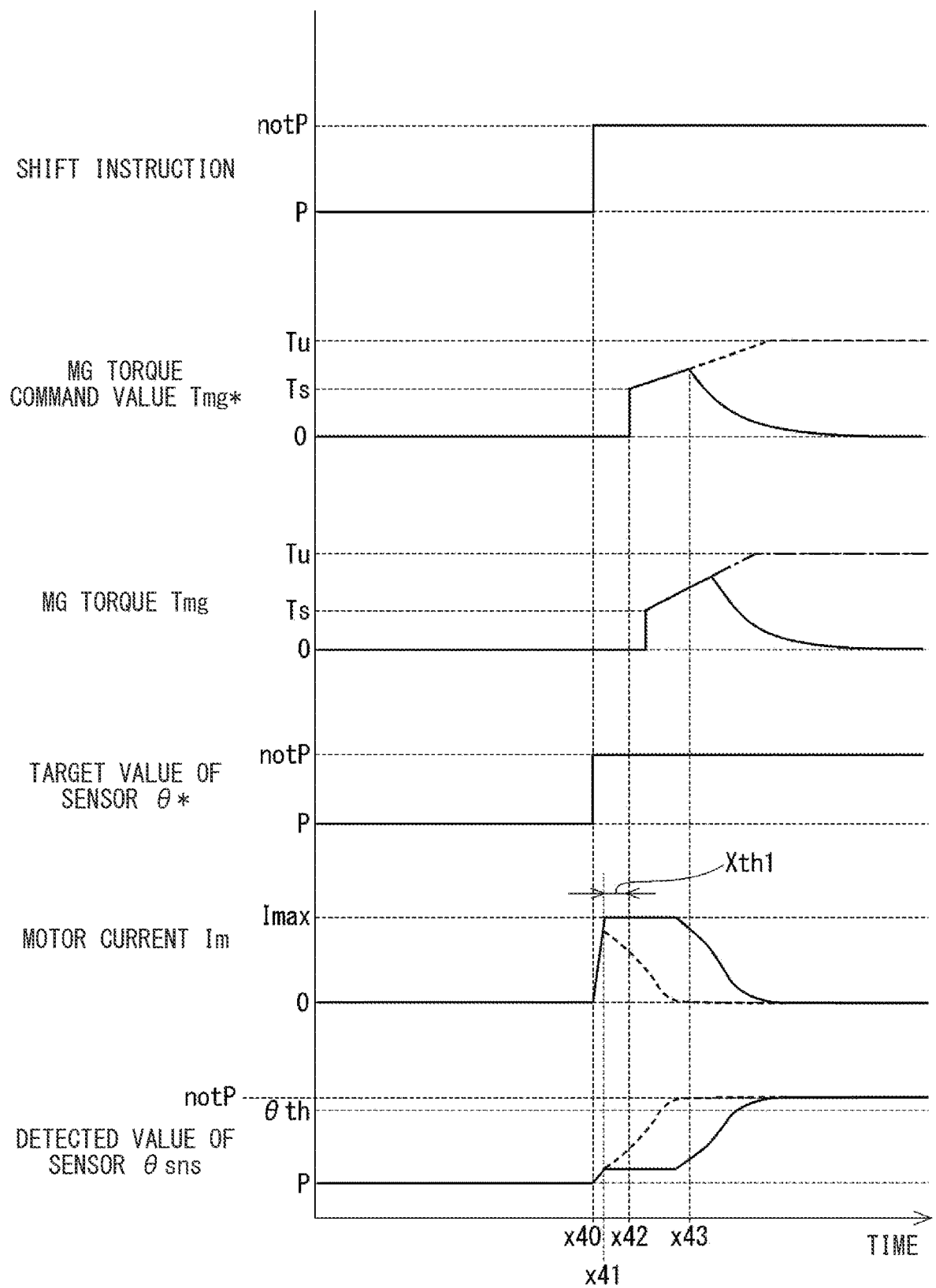
FIG. 21 is a time chart explaining the control processing of the P removal according to the fifth embodiment.

A fifth embodiment is shown in FIGS. 20 and 21. In the MG control processing shown in the flowchart of FIG. 20, S270 of FIG. 17 is omitted, and S264 is replaced by S282. Other points are the same as those of FIG. 17.

In S282 to which the process proceeds when the determination in S262 is affirmative, it is determined whether or not the motor current Im of the main motor 70 is stagnant. When it is determined that the motor current Im is stagnant (S282: YES), the process proceeds to S265, and when it is determined that the motor current Im is not stagnant (S282: NO), the process proceeds to S274.

The P removal control processing of the present embodiment will be described based on the time chart of FIG. 21. In FIG. 21, the horizontal axis represents a common time axis, and the vertical axis represents, from the top, a shift instruction, a MG torque command value Tmg*, a MG torque Tmg, a target value of the position sensor 68, a motor current Im, and the detected value θsns of the position sensor 68.

At time x40, when the shift instruction is switched from the P range to the not P range, the driving of the motor 50 is started. When the meshing surface pressure is not generated, the motor 50 does not stagnate, and the P removal is completed by the torque of the motor 50, as indicated by the dashed line. Also, the motor current Im decreases after passing the peak of the inrush current.

When there is a meshing surface pressure that makes it impossible to perform the P removal due to the torque of the motor 50, at time x11, at time x41, the detected value θsns of the position sensor 68 remains stagnant at a position where the detected value θsns is smaller than the implementation determination threshold value θth. Also, the motor current Im is stagnant at the maximum current Imax. At time x42 when the stagnation determination time Xth1 has elapsed from time x41, the main motor 70 is driven and the meshing surface pressure is reduced by the MG torque Tmg.

At time x43, the stagnation of the actuator 40 is resolved, and when the motor current Im is updated by decreasing from the maximum current Imax, the MG torque command value Tmg* is decreased. The processing after the start of MG torque reduction is the same as in the above-described embodiment, so description thereof will be omitted.

The actuator 40 includes the motor 50. In the present embodiment, the current sensor 67 that detects the current of the motor 50 corresponds to the "sensor unit". The stagnation determination section 822 determines that the stagnation of the actuator 40 has been resolved based on the detected value of the current sensor 67 when the current of the motor 50 changes from the stagnant state to a decrease. Even with this configuration, the MG torque Tmg can be reduced at the timing when the stagnation of the actuator 40 is resolved, and heat generation of the main motor 70 can be suppressed. In addition, the same effects as that of the embodiment described above can be obtained.

Sixth Embodiment

A sixth embodiment will be described with reference to FIG. 22. Since the sixth to eighth embodiments differ in the Tmg decrease processing in S214 and the like, this point will be mainly described. When a relatively large MG torque Tmg is required to reduce the meshing surface pressure, the twist of the axle 95 is large. Therefore, if the MG torque Tmg is abruptly reduced, a shock may occur.

Therefore, in the present embodiment, the decrease speed of the MG torque Tmg is made variable according to the inclination angle θi and the motor current Im when the stagnation is resolved. Specifically, the greater the inclination angle θi, the smaller the decrease speed of the MG torque Tmg. Also, the larger the motor current Im when the stagnation is resolved, the smaller the MG torque decrease speed. As a result, the shock caused by releasing the twist of the axle 95 can be reduced.

Figure 22:
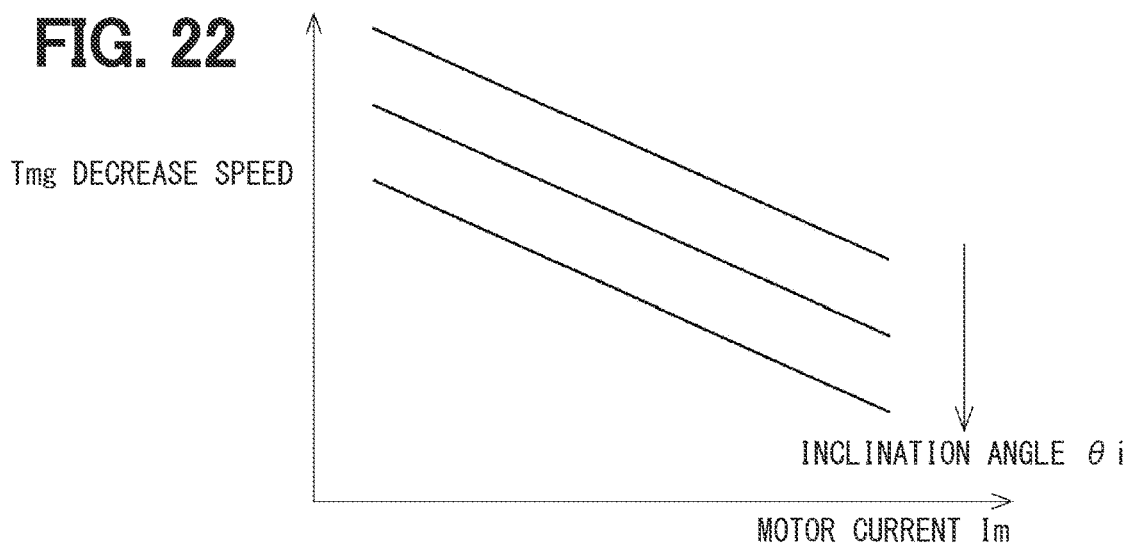
FIG. 22 is an explanatory diagram explaining setting of MG torque decrease speed according to a sixth embodiment.

FIG. 22 shows three maps corresponding to the inclination angle θi, but the number of maps may be two maps or four maps or more. The MG torque decrease speed may be set based on the inclination angle θi regardless of the motor current Im. Instead of map calculation, a function or the like may be used to set the motor torque decrease speed. The same applies to the seventh and eighth embodiments.

The drive control section 821 varies the decrease speed of MG torque Tmg according to the inclination state of the vehicle 100. Also, the MG drive control section 821 varies the decrease speed of the MG torque Tmg according to the current of the main motor 70. As a result, the MG torque Tmg can be appropriately reduced according to the amount of torsion of the axle 95, so that the occurrence of shock can be suppressed. In addition, the same effects as that of the embodiment described above can be obtained.

Seventh Embodiment

Figure 23:
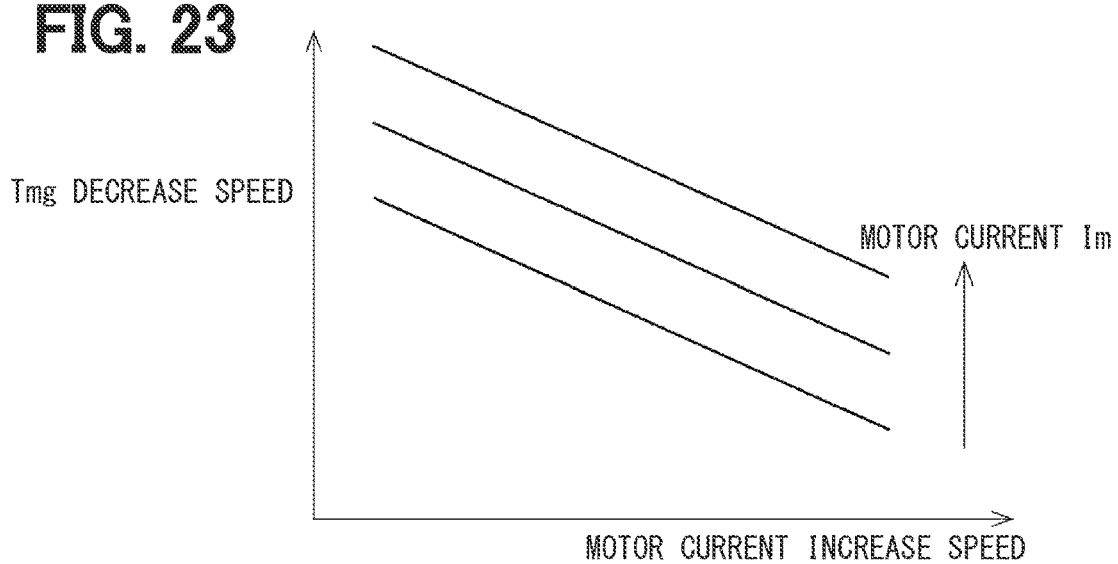
FIG. 23 is an explanatory diagram explaining setting of MG torque decrease speed according to a seventh embodiment.

A seventh embodiment will be described with reference to FIG. 23. In the present embodiment, when the amount of heat generated by the main motor 70 is large, the MG torque Tmg is quickly reduced in order to protect the main motor 70. The amount of heat generated by the main motor 70 is proportional to the square of the motor current Im times the energization time. Therefore, the larger the motor current Im and the longer the energization time, the larger the amount of heat generated by the main motor 70.

Therefore, in the present embodiment, the decrease speed of the MG torque Tmg is made variable according to the increase speed of the motor current Im and the motor current Im when the stagnation is resolved. Specifically, the larger the motor current Im when the stagnation is resolved, the larger the decrease speed of the MG torque. Also, the smaller the increase speed of the MG torque until the stagnation is resolved, the greater the decrease speed of the MG torque after the stagnation is resolved. Thereby, heat generation of the main motor 70 can be suppressed.

In the present embodiment, the decrease speed of the MG torque Tmg is made variable according to the amount of heat generated by the main motor 70. Specifically, when the amount of heat generated by the main motor 70 is large and the margin of the heat generation is small, the decrease speed of the MG torque Tmg is increased. Thereby, the main motor 70 can be thermally protected. In addition, the same effects as those of the above embodiment can be obtained.

Eighth Embodiment

Figure 24:
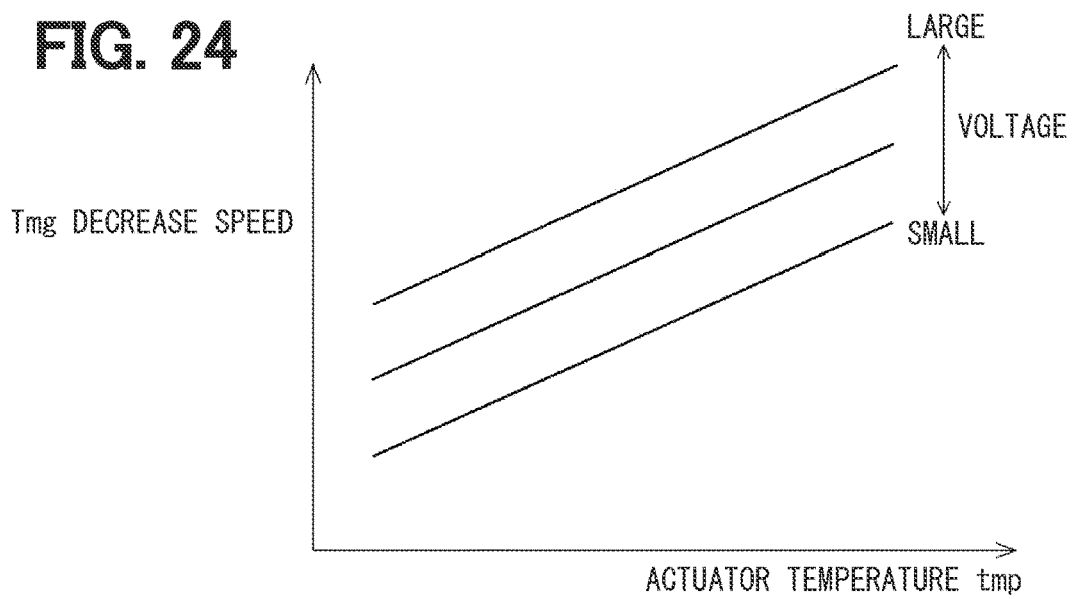
FIG. 24 is an explanatory diagram illustrating setting of the MG torque decrease speed according to an eighth embodiment.

An eighth embodiment will be described with reference to FIG. 24. In the present embodiment, when the responsiveness of the main motor 70 is low, the shock is suppressed by slowly decreasing the MG torque Tmg. Specifically, when an input voltage V is small, the MG torque decrease speed is reduced. Also, when the actuator temperature tmp is low, the MG torque decrease speed is reduced.

In the present embodiment, the decrease speed of the MG torque Tmg is made variable according to the temperature of the actuator 40. In the present embodiment, the detected value of the temperature sensor 69 is regarded as the actuator temperature tmp, but instead of the actuator temperature, the TM oil temperature may be used. As a result, the MG torque Tmg can be appropriately reduced according to the responsiveness of the actuator 40, so that the occurrence of shock can be suppressed. In addition, the same effects as that of the embodiment described above can be obtained.

In the present embodiment, the position sensor 68 corresponds to "sensor unit" and "rotation angle sensor", and the current sensor 67 corresponds to "sensor unit". The magnetic field of the sensor magnet 65 and the current of the motor 50 that change according to the rotation of the actuator 40 correspond to "physical quantities that change according to the driving of the actuator", the detent plate 21 corresponds to "detent member". The detent spring 25 corresponds to "biasing member", and the detent roller 26 corresponds to "engaging member". The MG drive control section 821 corresponds to the "main motor drive control section", and the MG torque Tmg corresponds to "main motor torque". Also, the P range release position By, the implementation determination threshold value θth, and the arrival determination value θr correspond to "reduction start position".

Other Embodiments

In the above embodiments, the stagnation of the actuator is determined based on the update of the maximum value of the position sensor, the arrival time to the arrival determination value, and the drive speed of the actuator. In another embodiment, these may be combined to determine actuator stagnation or stagnation release.

In the above embodiments, the decrease speed of the main motor torque is made variable according to the inclination state of the vehicle, the current of the main motor, the amount of heat generated by the main motor, and the temperature of the actuator. In another embodiment, the decrease speed of the main motor torque may be varied by combining some of the inclination state of the vehicle, the current of the main motor, the amount of heat generated by the main motor, and the temperature of the actuator. Further, the decrease speed of the main motor torque may be varied according to parameters other than the inclination state of the vehicle, the current of the main motor, the amount of heat generated by the main motor, and the temperature of the actuator.

In the above embodiments, the sensor unit is the position sensor that detects the rotation of the actuator or the current sensor that detects the current of the motor 50. In another embodiment, the sensor unit may be anything other than the position sensor and the current sensor as long as it detects a physical quantity that changes according to the driving of the actuator.

In the above embodiments, the number of reduction stages of the actuator are three. In another embodiment, the number of reduction stages may be two, four or more. Further, it is sufficient that the driving of the motor can be transmitted to the output shaft, and the structure of the mechanism for transmitting power from the motor to the output shaft may be different.

In the above embodiments, the motor is a brushed DC motor. In another embodiment, the motor may be other than a brushed DC motor. Further, in the above embodiments, the actuator has a usage region where the parking lock cannot be released when the meshing surface pressure is generated. In another embodiment, the actuator may not have the usage region where the parking lock cannot be released. Even in such a case, the load on the actuator can be reduced by performing the meshing surface pressure reduction control by the main motor.

In the above embodiments, the detent plate, which is the detent member, is provided with two valley portions. As another embodiment, the number of the valley portions is not limited to two and may be three or more. The configuration of the detent mechanism and the parking lock mechanism or the like may be different from those in the embodiments described above. In the above embodiment, the parking lock state is maintained by the detent mechanism 20. In another embodiment, instead of the detent mechanism 20, the parking lock state may be maintained by the self-locking mechanism of the actuator 40 itself.

The control unit/section and the technique according to the present disclosure may be achieved by a dedicated computer provided by constituting a processor and a memory programmed to execute one or more functions embodied by a computer program. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the embodiment described above but various modifications may be made within the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A vehicle control device for controlling a vehicle drive system, the vehicle drive system including a main motor as a driving source of the vehicle, a parking lock mechanism having a parking gear connected to an axle and a parking lever configured to be engaged with the parking gear so that an engagement of the parking gear and the parking lever allows the axle to be locked, and an actuator configured to drive the parking lever, the vehicle control device comprising: an actuator drive control section configured to control a drive of the actuator; a main motor drive control section configured to control a drive of the main motor; and a stagnation determination section configured to determine a stagnation of the actuator based on a detected value of a sensor unit that detects a physical quantity that changes according to a drive state of the actuator, wherein when a meshing surface pressure reduction control is performed to reduce a meshing surface pressure generated at a meshing point between the parking gear and the parking lever by driving the main motor at a torque, the main motor drive control section reduces the main motor torque before a range switching completion based on a detected value of the sensor unit.

2. The vehicle control device according to claim 1, wherein
the main motor drive control section starts reducing the torque of the main motor when it is determined that the stagnation of the actuator is resolved based on the detected value of the sensor unit.

3. The vehicle control device according to claim 2, wherein
the sensor unit is a rotation angle sensor that detects a rotation angle of the actuator.

4. The vehicle control device according to claim 3, wherein
the stagnation determination section determines that the stagnation of the actuator is resolved when the detected value of the rotation angle sensor reaches a reduction start position.

5. The vehicle control device according to claim 4, wherein
the reduction start position is a P range release position.

6. The vehicle control device according to claim 4, wherein
the vehicle drive system includes a detent member formed with a plurality of valley portions and connected to the parking lever, an engaging member capable of moving the valley portions by driving the actuator, and a detent mechanism having a biasing member that biases the engaging member in a direction to fit into the valley portion, and
the reduction start position is set between a peak position where the meshing surface pressure due to the load applied to the axle peaks and a position where the engaging member is moved to the valley portion corresponding to a notP range, which is a range other than a P range, by a biasing force of the biasing member.

7. The vehicle control device according to claim 4, wherein
the reduction start position is set between a peak position where the meshing surface pressure due to the load applied to the axle peaks and a P range release position.

8. The vehicle control device according to claim 3, wherein the stagnation determination section determines that the stagnation of the actuator is resolved when a rotation speed of the actuator exceeds a speed determination threshold value from a state in which the actuator is stagnant.

9. The vehicle control device according to claim 2, wherein
the actuator has a motor, and
the sensor unit is a current sensor that detects the current of the motor.

10. The vehicle control device according to claim 9, wherein
the stagnation determination section determines that the stagnation of the actuator is resolved when the current of the motor changes from a state of stagnation to a decrease based on the detected value of the current sensor.

11. The vehicle control device according to claim 1, wherein
the main motor drive control section varies a decrease speed of the main motor torque according to an inclination state of the vehicle.

12. The vehicle control device according to claim 1, wherein the main motor drive control section varies a decrease speed of the main motor torque according to the current of the main motor.

13. The vehicle control device according to claim 1, wherein the main motor drive control section varies a decrease speed of the main motor torque according to the amount of heat generated by the main motor.

14. The vehicle control device according to claim 1, wherein the main motor drive control section varies a decrease speed of the main motor torque according to the temperature of the actuator.

15. The vehicle control device according to claim 1, wherein the actuator has a usage environment region in which the parking lock cannot be released when the meshing surface pressure is generated.

* * * * *